US011627185B1

(12) United States Patent
Thomas

(10) Patent No.: US 11,627,185 B1
(45) Date of Patent: Apr. 11, 2023

(54) WIRELESS DATA PROTOCOL

(71) Applicant: Amazon Technologies, Inc., Seattle, WA (US)

(72) Inventor: Joveen Joseph Thomas, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 17/026,560

(22) Filed: Sep. 21, 2020

(51) Int. Cl.
H04L 67/1074 (2022.01)
H04L 47/12 (2022.01)

(52) U.S. Cl.
CPC .......... *H04L 67/108* (2013.01); *H04L 47/12* (2013.01)

(58) Field of Classification Search
CPC .......... H04L 67/108; H04L 2012/5652; H04L 69/166; H04L 47/12; H04W 28/065
USPC ........................................ 709/231, 232, 236
See application file for complete search history.

(56) References Cited

U.S. PATENT DOCUMENTS

| | | | |
|---|---|---|---|
| 6,839,322 B1 * | 1/2005 | Ashwood Smith | H04Q 11/0005 370/476 |
| 7,114,009 B2 * | 9/2006 | Jones | H04L 12/4633 709/236 |
| 7,215,662 B1 * | 5/2007 | Lim | H04L 49/3009 709/236 |
| 7,236,501 B1 * | 6/2007 | Lim | H04L 69/166 370/414 |
| 7,239,630 B1 * | 7/2007 | Lim | H04L 45/00 709/236 |
| 7,310,310 B1 * | 12/2007 | Shenoi | H04L 12/66 370/238.1 |
| 7,324,444 B1 * | 1/2008 | Liang | H04L 29/06027 370/230.1 |
| 7,515,604 B2 * | 4/2009 | Kojima | H04L 69/161 370/466 |
| 8,155,146 B1 * | 4/2012 | Vincent | H04L 12/4633 370/473 |
| 8,300,641 B1 * | 10/2012 | Vincent | H04L 69/22 370/392 |
| 8,774,213 B2 * | 7/2014 | Vincent | H04L 63/0272 370/235 |
| 8,788,570 B2 * | 7/2014 | Goel | H04L 69/22 709/228 |
| 8,804,740 B2 * | 8/2014 | Rangaraman | H04L 45/38 370/396 |
| 8,964,548 B1 * | 2/2015 | Keralapura | H04L 43/026 370/235 |
| 8,990,431 B2 * | 3/2015 | Goel | H04L 67/28 709/228 |
| 9,753,807 B1 * | 9/2017 | Donlan | G06F 11/1076 |
| 9,762,703 B2 * | 9/2017 | Chun | G06Q 30/0277 |

(Continued)

*Primary Examiner* — Thu Ha T Nguyen
(74) *Attorney, Agent, or Firm* — Lee & Hayes, P.C.

(57) ABSTRACT

Systems and methods for a wireless data protocol are disclosed. For example, a packet fragmentation scheme is determined and utilized to fragment high bit rate packets. A packet spacing scheme and a number of parity slots to utilize is determined, and then packet fragment representations are generated utilizing the packet spacing scheme and the number of parity slots. The packet fragment representations are appended to their corresponding packet fragments and sent to a receiving device. The receiving device may then utilize the packet fragment representations to reconstruct packets that are lost during transmission.

20 Claims, 15 Drawing Sheets

(56) References Cited

U.S. PATENT DOCUMENTS

| | | | |
|---|---|---|---|
| 9,864,538 B1* | 1/2018 | Johnson | G06F 3/0626 |
| 10,127,918 B1* | 11/2018 | Kamath Koteshwara | G11B 27/038 |
| 10,742,555 B1* | 8/2020 | Shalev | H04L 47/283 |
| 2002/0099858 A1* | 7/2002 | Lindo | H04L 9/40 709/250 |
| 2003/0081592 A1* | 5/2003 | Krishnarajah | H04L 69/22 370/352 |
| 2004/0064688 A1* | 4/2004 | Jacobs | H04L 63/0245 713/150 |
| 2005/0220093 A1* | 10/2005 | Chen | H04L 49/90 370/389 |
| 2006/0209742 A1* | 9/2006 | Haner | H04L 69/16 370/328 |
| 2007/0171928 A1* | 7/2007 | Kim | H04L 47/10 370/535 |
| 2012/0207020 A1* | 8/2012 | Li | H04L 47/125 370/235 |
| 2012/0250682 A1* | 10/2012 | Vincent | G06F 9/45558 370/392 |
| 2012/0250686 A1* | 10/2012 | Vincent | H04L 12/4633 370/392 |
| 2013/0182573 A1* | 7/2013 | Soppera | H04L 47/29 370/235 |
| 2014/0369194 A1* | 12/2014 | Friedman | H04L 47/245 370/235 |
| 2018/0115635 A1* | 4/2018 | Ahuja | H04L 63/0428 |
| 2020/0128113 A1* | 4/2020 | Ambati | H04L 45/74 |

\* cited by examiner

| Fragments Received | Fragments Not Received | Number of Correctable Loss Patterns 1 Parity Slot | Number of Correctable Loss Patterns 2 Parity Slots | Total Loss Patterns |
|---|---|---|---|---|
| 8 | 0 | 1 | 1 | 1 |
| 7 | 1 | 8 | 8 | 8 |
| 6 | 2 | 28 | 28 | 28 |
| 5 | 3 | 48 | 56 | 56 |
| 4 | 4 | 28 | 70 | 70 |
| 3 | 5 | 0 | 48 | 56 |
| 2 | 6 | 0 | 0 | 28 |
| 1 | 7 | 0 | 0 | 8 |
| 0 | 8 | 0 | 0 | 1 |
| | | Total Correctable Fragments: 113 | Total Correctable Fragments: 211 | Total Possibilities: 256 |
| | | Bandwidth = 2X | Bandwidth = 3X | |

FIG. 7

WIRELESS DATA PROTOCOL

BACKGROUND

Electronic devices may be configured to wirelessly send data. Such data may be sent from a sending device to a receiving device in data packets. Described herein are improvements in technology and solutions to technical problems that can be used to, among other things, improve data packet transmission.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a chart indicating packet fragment recovery when a single parity slot is utilized and when multiple parity slots are utilized.

DETAILED DESCRIPTION

Figure 1:
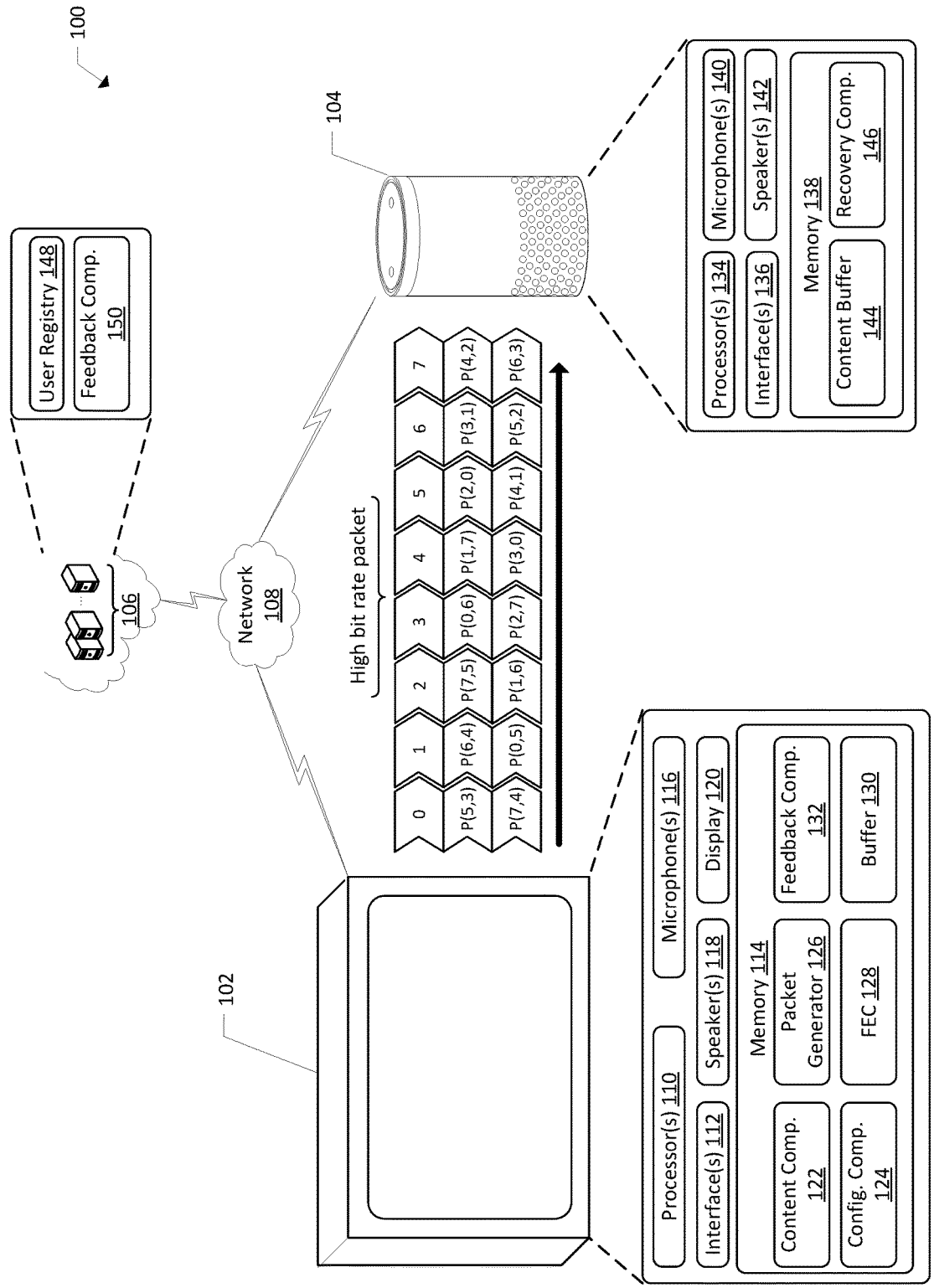
FIG. 1 illustrates a schematic diagram of an example environment for improved packet resiliency associated with a wireless data protocol.

Systems and methods for a wireless data protocol are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example.

In examples, at least one of the electronic devices may be configured to receive content data, such as from one or more of the other electronic devices and/or from a remote system. The content data may include various types of content, such as audio data, image data, text data, and/or other data. In some examples, the content may be transmitted in different types of packets having different sizes. Some high bit rate packets, such as packets utilizing a multi-channel audio coding standard, may include more data per packet than other packets having smaller maximum transmission unit size. For example, a given high bit rate packet may have over 3,000 bytes of data. For these high bit rate packets, even if fragmented before being sent, the loss of a single packet fragment could mean the loss of the entire packet, which may include 30 or more milliseconds of content output. This packet loss may hinder the quality of content output. As such, being able to minimize packet loss and/or reconstruct lost packets becomes important particularly when high bit rate packets are been transmitted.

Generally, when content data is sent between devices, the sending device may generate data packets that include the content data. The data packets may include a header portion that indicates the sequence of the packets as well as, in examples, other identifying information associated with the data packets. The data packets may also include a payload portion that includes, for each individual packet, a portion of the content data. These packets may be sent to the receiving device. However, some packets may be lost during transmission. Packet loss, as used herein, includes when a given packet is not received at all at a receiving device or when a given packet is received at the receiving device but is received too late to be utilized for outputting the content associated with the packet. Packet loss may result from one or more factors, including transmission interference by other devices, physical impedances, network issues, etc.

To assist in lost packet recovery, particularly for high bit rate data packets, the electric device may be configured to generate packets that include both content data as well as one or more representations of other packets that may be lost. For example, a content component of the electronic device may be configured to receive the content data that is to be sent to the receiving device(s). That content data may be received, for example, from a remote system configured to provide the content data, such as in response to a user request for such content data. The user request may be in the form of a voice command, such as when the electronic device includes a voice user interface, and/or in the form of user input data corresponding to user input received at, for example, a graphical user interface of the electronic device.

A configuration component of the electronic device may be configured to determine a configuration of one or more of the receiving devices and/or of the electronic device. For example, the configuration component may be utilized to determine if one or more receiving devices are enabled for outputting at least a portion of the content, such as audio data, while the electronic device outputs images. In still other examples, the sending device may output content of the same type as the receiving device, such as both devices outputting audio. In these examples, an instance of the audio data may be utilized by the sending device to output audio while another instance of the audio data, such as with the packet representations as described herein, may be sent to the receiving device. In these examples, the buffers of both devices may be utilized to temporarily store data packets such that audio may be output by both devices in time synchronization with each other. In still other examples, multiple receiving devices may be configured to output the audio, and in these examples the sending device may send an instance of the audio data to each of the receiving devices. The audio-data packets sent to the receiving devices may include the packet representations as discussed herein. The configuration component may also be utilized to determine a number of the receiving devices and, thus, a number of instances of the audio data and/or portions of the audio data to send to the receiving devices. The configuration component may determine whether data packet generation as described herein may be initiated.

Once the device determines that data packets are to be generated for sending to the receiving device(s), a packet generator may be configured to generate the packets. The packet generator may generate packets that include a header as discuss herein as well as a payload including portions of the data to be sent to the receiving device(s). When generating the data packets, a forward error correction (FEC) component may be utilized to control errors in data transmission between the electronic device and the receiving device(s). For example, the FEC component may encode the data packets and/or data included in the data packets in a redundant way, such as by utilizing error-correcting code that allows the receiving device(s) to detect errors in data transmission and to correct those errors without the electronic device having to send duplicate packets. Specifically, the FEC component may receive the data packets from the packet generator and may generate representations of data packets to append to the data in the data packets. To do so, the FEC component may determine one or more of a fragmentation scheme to utilize for fragmenting a given high bit rate packet, a packet spacing scheme to apply when generating packet fragment representations, and whether a single packet fragment representation is to be generated or whether multiple packet fragment representations are to be generated and appended to each packet fragment. Packet fragment representations, as described herein, include exclusive of (Xor) data on content data for two or more packet fragments. These determinations may be based at least in part on historical packet loss data associated with the sending device and/or the receiving device. For example, the historical packet loss data may indicate that when packets are lost, consecutive packets are lost more frequently than non-consecutive packet loss. The historical packet loss data may also indicate days and/or times and/or environmental conditions associated with the packet loss, which may be utilized to determine whether, at a given time or day, or when a given environmental condition is detected, the packet configuration should be changed and/or maintained.

With respect to the fragmentation scheme, a high bit rate packet may be fragmented into two or more fragments, each including a portion of the content data from the high bit rate packet. Two example fragmentation schemes, an eight-fragment scheme and a twelve-fragment scheme, will be used throughout this disclosure by way of illustration. However, it should be understood that these examples are non-limiting and this disclosure includes fragmentation schemes where packets are fragmented into two or more fragments. In some examples, such as based at least in part on the historical packet loss data, the FEC component may determine that the eight-fragment scheme is preferable because packet loss does not frequently occur. In other examples, the twelve-fragment scheme may be preferable, such as when packets are frequently lost and/or when the type of content associated with the high bit rate packet allows for greater latency in the increased fragmentation of the packet and subsequent increase in number of packet fragment representations to be generated. In examples, the fragmentation scheme may be based at least in part on the size of the original packet. For example, a data packet with 5,000 bytes of content data may be fragmented utilizing an eight-fragment scheme while a data packet with 6,000 bytes of content data may be fragmented utilizing a twelve-fragment scheme.

With respect to the packet spacing scheme, for a given packet fragment, one or more packet fragment representations may be generated and appended to the given fragment. The packet fragment representation may be a representation of two of the other packet fragments of the high bit rate packet. The packet spacing scheme may be utilized to select which of the other packet fragments will be utilized to generate the packet fragment representation to be appended to the packet fragment at issue. That packet representation may be appended or otherwise included in the given packet at issue. For example, if eight packet fragments, fragments 0-7, are to be sent from the electronic device to the receiving device(s), each of the eight packet fragments may have one or more packet fragment representations appended to them. Take, for example, packet fragment 4, if a packet spacing scheme of 2 packets is selected, then the packet fragment representation to be appended to packet fragment 4 may include a representation of packet fragment 6 and packet fragment 0. Note that in this example the fragments are circularly linked such that packet counting starts over at 0 after the last fragment, here fragment 7. The fragment representation may be generated utilizing an exclusive disjunction logical operation (e.g., Xor) of the content data of fragment 6 and fragment 0. Such logical operations output as true only when inputs differ. Utilizing a simplified example, if the data associated with fragment 6 was represented as binary code of 10011, and fragment 0 was represented as 11001, the representation of these packets utilizing the Xor logical operation would be 01010. This representation may be appended or otherwise added to fragment 4 before a data packet representing that fragment is sent to the receiving device(s). The same process may be repeated for the other packets to be sent. The packet generator may be utilized to generate the final packets to be sent to the receiving device(s) with the packet representations appended thereto. While a packet spacing scheme of 2 packets is utilized above by way of example, it should be understood that any packet spacing may be utilized.

With respect to the number of packet fragment representations to utilize, the FEC component may determine to utilize a single packet fragment representation to be appended to each fragment, otherwise described herein as a single parity slot, or the FEC component may determine to utilize two or more packet fragment representations to be appended to each fragment. It should be noted that while the use of two packet fragment representations is utilized by way of example herein, this disclosure includes the ability to use one, two, three, or more packet fragment representations to be appended to each fragment. For example, as explained in more detail elsewhere herein, when historical packet loss data indicates that, for an eight-fragment scheme, two or less packet fragments are typically lost, the FEC component may utilize the single packet fragment representation scheme. However, when three or more packet fragments are typically lost, the FEC component may utilize the multiple packet fragment representation scheme. In instances where multiple packet fragment representations are to be appended to a given packet fragment, the packet spacing scheme for each of the packet fragment representations may differ. For example, for the first parity slot, a packet spacing of 2 packets may be utilized, while the second parity slot may utilize a packet spacing of 5. Additional and different packet spacings may also be utilized.

Additionally, a feedback component of the electronic device may be utilized to receive packet-loss data from one or more sources, such as from the receiving device(s) and/or from a remote system. For example, the receiving device(s) may determine which packets are lost from the electronic device. By way of example, each packet may be consecutively numbered and data indicating that numbering may be included in the header portion of the packets. The receiving device(s) may utilize that data to determine an ordering of the packets, such as for correct output of audio when the content data includes audio data. If a packet is lost and/or is not received in time to be utilized for output by the receiving device(s), the receiving device(s) may determine that the received packets do not include at least one of the consecutively-numbered packets. This packet-loss data may be sent to the electronic device, which may utilize this information to select packet configurations. For example, the packet-loss data may indicate that two packets are consecutively lost frequently, such as more than a threshold amount of times, that three or more packets are consecutively lost frequently, and/or that packets are not consecutively lost frequently. The electronic device may receive this packet-loss data and utilize the data to select a packet configuration. For example, when packets are not consecutively lost frequently, the FEC component may select a packet configuration with a fragmentation scheme having fewer packet fragments, a packet spacing scheme with less spacing, and where only a single parity slot is utilized. When two or more packets are consecutively lost frequently, and/or when the total number of lost fragments for high bit rate packets satisfies a threshold number, the FEC component may select a packet configuration where increased fragmentation occurs, increased packet spacing is utilized, and where multiple parity slots are utilized.

With respect to the receiving device(s), they may include a content buffer and a recovery component. The content buffer may be utilized to temporarily store received data packets from the electronic device and output content associated with those packets, such as pursuant to a timing parameter when the content is to be output in a synchronous manner with the output of other content by one or more other receiving devices and/or by the electronic device. Additionally, the content buffer may be utilized to store received data packets such that lost packets may be recovered prior to when those lost packets are needed for output.

The recovery component may be configured to determine when and which packets are lost and to attempt to recover or otherwise reconstruct those packets. For example, the data packets may be sent from the electronic device utilizing a packet configuration having a packet spacing of 3. If the lost packet, for example, is fragment 3, then the recovery component may attempt to utilize the Xor data and the other packets to recover fragment 3. For example, the recovery component may utilize the Xor data from fragment 0 and/or fragment 6 as well as the content data from fragment 5 and/or fragment 1 to reconstruct the content data from fragment 3. In this example, the recovery component may have two opportunities to reconstruct fragment 3. In examples where multiple parity slots are utilized, there may be four opportunities to reconstruct a given fragment. For example, when the first parity slot has a packet spacing of 2 and the second parity slot has a packet spacing of 5, each packet fragment may include Xor data associated with four other fragments. In this example, if fragment 3 is lost, the Xor data from fragments 0 and 6 (in the first parity slot) and fragments 4 and 7 (in the second parity slot) may be utilized to reconstruct fragment 3. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for improved packet resiliency associated with a wireless data protocol. The system 100 may include, for example, an electronic device 102, which may include a communal device and/or a personal device. In certain examples, the device 102 may be a voice-enabled device (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). In examples, the electronic device may be set-top box or other device that receives content data and facilitates the output of content, such as on other devices. The electronic device 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more receiving devices 104, which may be electronic devices 102 and/or may be other devices. The receiving devices 104 may be configured to receive data packets from the electronic device 102 and to perform operations associated with reconstruction of lost packets, as described herein. The system 100 may also include one or more personal devices, which may be electronic devices, such as a mobile phone, tablet, laptop, wearable device, and/or other computing device that is specifically associated with a given user profile. The electronic devices 102, receiving devices 104, and the personal devices may be configured to send data to and/or receive data from a remote system 106, such as via a network 108. Additionally, when content data is described herein as being sent from the remote system 106 to the electronic devices 102 and/or the receiving devices 104, it should be understood that the content data may be received from the electronic devices 102 and/or one or more other devices that are local to the electronic devices 102 and/or the receiving devices 104. By way of example, and not as an exclusive limitation, a laptop or phone that includes downloaded content could send the content data to the one or more devices described herein. In still further examples, the content may be created in real time, such as a microphone in a local device acting as an intercom and/or a karaoke feature. Additionally, it should be understood that a given space and/or environment may include numerous electronic devices 102 and/or receiving devices 104 and/or personal devices. It should also be understood that when a "space" or "environment" is used herein, those terms mean an area and not necessarily a given room, building, or other structure, unless otherwise specifically described as such.

The electronic devices 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 104. The displays 120 may be configured to display images corresponding to image data, such as image data received from the remote system 106 and/or one or more other devices, such as the receiving devices 104. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices. The memory 114 of the electronic device 102 may include one or more components, such as for example, a content component 122, a configuration component 124, a packet generator 126, a forward error correction (FEC) component 128, a buffer 130, and/or a feedback component 132. Each of these components will be described in detail by way of example below.

The receiving devices 104 may include one or more components, such as for example, one or more processors 134, one or more network interfaces 136, memory 138, one or more microphones 140, and/or one or more speakers 142. The microphones 140 and/or the speakers 142 may be the same or similar to, and/or may perform the same or similar functions as, the microphones 116 and/or the speakers 118 discussed with respect to the electronic device 102. The memory 138 may include one or more components, such as for example, a content buffer 144 and/or a recovery component 146. Each of these components will be described below in detail by way of example.

The remote system 106 may include components such as, for example, a user registry 148 and/or a feedback component 150. While not depicted, the remote system 106 may also include a speech-processing system. It should be understood that while the speech-processing system and the other components are depicted and/or described as separate from each other in FIG. 1, some or all of the components may be a part of the same system. The speech-processing system may include an automatic speech recognition component (ASR) and/or a natural language understanding component (NLU). Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech component, a link or other resource locator for audio data, and/or a command to a device, such as the electronic device 102.

In instances where a voice-enabled device is utilized, skills may extend the functionality of devices 102, 104 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the electronic device 102, the receiving device(s) 104, and the remote system 106 are described in detail below. In examples, some or each of the components of the remote system 106 may include their own processor(s), network interface(s), and/or memory. As such, by way of example, the speech-processing system may include and/or be associated with processor(s), network interface(s), and/or memory. The other components of the remote system 106, such as the feedback component 150, may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 148 may be configured to determine and/or generate associations between users, user accounts, and/or devices. For example, one or more associations between user accounts may be identified, determined, and/or generated by the user registry 148. The user registry 148 may additionally store information indicating one or more applications and/or resources accessible to and/or enabled for a given user account. Additionally, the user registry 148 may include information indicating device identifiers, such as naming identifiers, associated with a given user account, as well as device types associated with the device identifiers. The user registry 148 may also include information indicating user account identifiers, naming indicators of devices associated with user accounts, and/or associations between devices, such as the devices 102, 104. The user registry 148 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. The user registry 148 may also include data indicating which receiving devices 104 are associated with which electronic devices 102 and/or whether a given receiving device 104 is enabled to output content instead of an electronic device 102.

The speech-processing system may be configured to receive audio data from the devices 102, 104 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Video A," the NLU component may identify a "play" intent and the payload may be "Video A." In this example where the intent data indicates an intent to play content with a naming indicator of "Video A," the speech-processing system may call one or more speechlets to effectuate the intent. Speechlets, as described herein may otherwise be described as applications and may include functionality for utilizing intent data to generate directives and/or instructions. For example, a content speechlet may be called when the intent indicates that content is to be retrieved for sending to a device. The speechlet may be designated as being configured to handle the intent of sending requested content, for example. The speechlet may receive the intent data and/or other data associated with the user utterance from the NLU component, such as by an orchestrator of the remote system 106, and may perform operations to instruct the device 102, 104 to output the content, for example. The remote system 106 may generate audio data confirming that requested content has been provided, such as by a text-to-speech component. The audio data may be sent from the remote system 106 to the electronic device 102 for output of corresponding audio by the speakers 118 of the device 102.

The various components of the electronic device 102, the receiving devices 104, and the remote system 106 will now be described by way of example. In examples, the electronic device 102 may be configured to receive content data, such as from one or more other devices and/or from a remote system 106. For example, the content component 122 may be configured to receive the content data from the remote system 106. The content data may include various types of content, such as audio data, image data, text data, and/or otherwise multimedia data. When the content data includes image data, the electronic device 102 may be configured to display corresponding images. When the content data includes audio data, the electronic device 102 may be configured to output corresponding audio. However, in certain examples, the electronic device 102 may not be configured to present certain types of content. For example, the electronic device 102 may not include a display and thus may not be configured to present images. In still other examples, the receiving devices 104 associated with the electronic device 102 may be configured to output audio instead of the electronic device 102 outputting audio, such as in a whole-home audio configuration. In these and other examples, the electronic device 102 may send all or a portion of the content data to one or more of the receiving devices 104 for the receiving devices 104 to output corresponding content. It should be understood that while the several examples provided herein illustrate the sending of audio data from the electronic device 102 to one or more receiving devices 104, such that the receiving devices 104 output corresponding audio while the electronic device 102, in examples, outputs images associated with the audio data, the generation of data packets and the sending of the same may include data other than audio data. The user registry 148 of the remote system 106 may be utilized to determine whether there are one or more receiving devices 104 that are configured to output content instead of or in addition to the electronic device. The configuration component 124 of the electronic device 102 may query the user registry 148 for data indicating the device configurations and/or the configuration component 124 may query the receiving devices 104 directly for configuration information.

The configuration component 124 may be configured to determine a configuration of one or more of the receiving devices 104 and/or of the electronic device 102. For example, the configuration component 124 may be utilized to determine if one or more receiving devices 104 are enabled for outputting at least a portion of the content, such as audio data, while the electronic device 102 outputs images. In still other examples, the electronic device 102 may output content of the same type as the receiving device 104, such as both devices 102, 104 outputting audio. In these examples, an instance of the audio data may be utilized by the electronic device 102 to output audio while another instance of the audio data, such as with the packet representations as described herein, may be sent to the receiving device 104. In these examples, the buffers 130, 144 of both devices 102, 104 may be utilized to temporarily store data packets such that audio may be output by both devices 102, 104 in time synchronization with each other. In still other examples, multiple receiving devices 104 may be configured to output the audio, and in these examples the electronic device 102 may send an instance of the audio data to each of the receiving devices 104. The audio-data packets sent to the receiving devices 104 may include the packet representations as discussed herein. The configuration component 124 may also be utilized to determine a number of the receiving devices 104 and, thus, a number of instances of the audio data and/or portions of the audio data to send to the receiving devices 104. The configuration component 124 may determine whether data packet generation as described herein may be initiated.

Once the electronic device 102 determines that data packets are to be generated for sending to the receiving device(s) 104, the packet generator 126 may be configured to generate the packets. The packet generator 126 may generate packets that include a header as discussed herein as well as a payload including portions of the data to be sent to the receiving device(s) 104. When generating the data packets, the forward error correction (FEC) component 128 may be utilized to control errors in data transmission between the electronic device 102 and the receiving device(s) 104. For example, the FEC component 128 may encode the data packets and/or data included in the data packets in a redundant way, such as by utilizing error-correcting code that allows the receiving device(s) 104 to detect errors in data transmission and to correct those errors without the electronic device 102 having to send duplicate packets. Specifically, the FEC component 128 may receive the data packets from the packet generator 126 and may generate representations of data packets to append to the data in the data packets. To do so, the FEC component 128 may determine one or more of a fragmentation scheme to utilize for fragmenting a given high bit rate packet, a packet spacing to apply when generating packet fragment representations, and whether a single packet fragment representation is to be generated or whether multiple packet fragment representations are to be generated and appended to each packet fragment. These determinations may be based at least in part on historical packet loss data associated with the electronic device 102 and/or the receiving device 104. For example, the historical packet loss data may indicate that when packets are lost, consecutive packets are lost more frequently than non-consecutive packet loss. The historical packet loss data may also indicate days and/or times and/or environmental conditions associated with the packet loss, which may be utilized to determine whether, at a given time or day, or when a given environmental condition is detected, the packet configuration should be changed and/or maintained.

With respect to the fragmentation scheme, a high bit rate packet may be fragmented into two or more fragments, each including a portion of the content data from the high bit rate packet. Two example fragmentation schemes, an eight-fragment scheme and a twelve-fragment scheme, will be used throughout this disclosure by way of illustration. However, it should be understood that these examples are non-limiting and this disclosure includes fragmentation schemes where packets are fragmented into two or more fragments. In some examples, such as based at least in part on the historical packet loss data, the FEC component 128 may determine that the eight-fragment scheme is preferable because packet loss does not frequently occur. In other examples, the twelve-fragment scheme may be preferable, such as when packets are frequently lost and/or when the type of content associated with the high bit rate packet allows for greater latency in the increased fragmentation of the packet and subsequent increase in number of packet fragment representations to be generated. In examples, the fragmentation scheme may be based at least in part on the size of the original packet. For example, a data packet with 5,000 bytes of content data may be fragmented utilizing an eight-fragment scheme while a data packet with 6,000 bytes of content data may be fragmented utilizing a twelve-fragment scheme.

With respect to the packet spacing scheme, for a given packet fragment, one or more packet fragment representations may be generated and appended to the given fragment. The packet fragment representation may be a representation of two of the other packet fragments of the high bit rate packet. The packet spacing scheme may be utilized to select which of the other packet fragments will be utilized to generate the packet fragment representation to be appended to the packet fragment at issue. For example, for a given data packet, the FEC component 128 may generate a packet representation that includes a previous packet and a subsequent packet. That packet representation may be appended or otherwise included in the given packet at issue. For example, if eight packet fragments, fragments 0-7, are to be sent from the electronic device to the receiving device(s), each of the eight packet fragments may have one or more packet fragment representations appended to them. Take, for example, packet fragment 4, if a packet spacing scheme of 2 packets is selected, then the packet fragment representation to be appended to packet fragment 4 may include a representation of packet fragment 6 and packet fragment 0. Note that in this example the fragments are circularly linked such that packet counting starts over at 0 after the last fragment (here fragment 7). The fragment representation may be generated utilizing an exclusive disjunction logical operation (e.g., Xor) of the content data of fragment 6 and fragment 0. Such logical operations output as true only when inputs differ. Utilizing a simplified example, if the data associated with fragment 6 was represented as binary code of 10011, and fragment 0 was represented as 11001, the representation of these packets utilizing the Xor logical operation would be 01010. This representation may be appended or otherwise added to fragment 4 before a data packet representing that fragment is sent to the receiving device(s) 104. The same process may be repeated for the other packets to be sent. The packet generator 126 may be utilized to generate the final packets to be sent to the receiving device(s) 104 with the packet representations appended thereto. While a packet spacing scheme of 2 packets is utilized above by way of example, it should be understood that any packet spacing may be utilized.

With respect to the number of packet fragment representations to utilize, the FEC component 128 may determine to utilize a single packet fragment representation to be appended to each fragment, otherwise described herein as a single parity slot, or the FEC component 128 may determine to utilize two or more packet fragment representations to be appended to each fragment. It should be noted that while the use of two packet fragment representations is utilized by way of example herein, this disclosure includes the ability to use one, two, three, or more packet fragment representations to be appended to each fragment. For example, as explained in more detail elsewhere herein, when the historical packet loss data indicates that, for an eight-fragment scheme, two or less packet fragments are typically lost, the FEC component 128 may utilize the single packet fragment representation scheme. However, when three or more packet fragments are typically lost, the FEC component 128 may utilize the multiple packet fragment representation scheme. In instances where multiple packet fragment representations are to be appended to a given packet fragment, the packet spacing scheme for each of the packet fragment representations may differ. For example, for the first parity slot, a packet spacing of 2 packets may be utilized, while the second parity slot may utilize a packet spacing of 5. Additional and different packet spacings may also be utilized.

The feedback component 132 of the electronic device 102 may be utilized to receive packet-loss data from one or more sources, such as from the receiving device(s) 104 and/or from the remote system 106. For example, the receiving device(s) 104 may determine which packets are lost from the electronic device 102. By way of example, each packet may be consecutively numbered and data indicating that numbering may be included in the header portion of the packets. The receiving device(s) 104 may utilize that data to determine an ordering of the packets, such as for correct output of audio when the content data includes audio data. If a packet is lost and/or is not received in time to be utilized for output by the receiving device(s) 104, the receiving device(s) 104 may determine that the received packets do not include at least one of the consecutively-numbered packets. This packet-loss data may be sent to the electronic device 102, which may utilize this information to select packet configurations. For example, the packet-loss data may indicate that two packets are consecutively lost frequently, such as more than a threshold amount of times, that three or more packets are consecutively lost frequently, and/or that packets are not consecutively lost frequently. The electronic device 102 may receive this packet-loss data and utilize the data to select a packet configuration. For example, when packets are not consecutively lost frequently, the FEC component 128 may select a packet configuration with a fragmentation scheme having fewer packet fragments, a packet spacing scheme with less spacing, and where only a single parity slot is utilized. When two or more packets are consecutively lost frequently, and/or when the total number of lost fragments for high bit rate packets satisfies a threshold number, the FEC component 128 may select a packet configuration where increased fragmentation occurs, increased packet spacing is utilized, and where multiple parity slots are utilized. Additionally, or alternatively, the feedback component 150 of the remote system 106 may perform one or more of the operations described above with respect to the feedback component 132 of the electronic device 102.

With respect to the receiving device(s) 104, they may include the content buffer 144 and the recovery component 146. The content buffer 144 may be utilized to temporarily store received data packets from the electronic device 102 and output content associated with those packets, such as pursuant to a timing parameter when the content is to be output in a synchronous manner with the output of other content by one or more other receiving devices 104 and/or by the electronic device 102. Additionally, the content buffer 144 may be utilized to store received data packets such that lost packets may be recovered prior to when those lost packets are needed for output.

The recovery component 146 may be configured to determine when and which packets are lost and to attempt to recover or otherwise reconstruct those packets. For example, the data packets may be sent from the electronic device 102 utilizing a packet configuration having a packet spacing of 3. If the lost packet, for example, is fragment 3, then the recovery component may attempt to utilize the Xor data and the other packets to recover fragment 3. For example, the recovery component 146 may utilize the Xor data from fragment 0 and/or fragment 6 as well as the content data from fragment 5 and/or fragment 1 to reconstruct the content data from fragment 3. In this example, the recovery component 146 may have two opportunities to reconstruct fragment 3. In examples where multiple parity slots are utilized, there may be four opportunities to reconstruct a given fragment. For example, when the first parity slot has a packet spacing of 2 and the second parity slot has a packet spacing of 5, each packet fragment may include Xor data associated with four other fragments. In this example, if fragment 3 is lost, the Xor data from fragment 0 and 6 (in the first parity slot) and fragments 4 and 7 (in the second parity slot) may be utilized to reconstruct fragment 3. The recovered packet may be added to the content buffer 144 and utilized to output the content in turn. By utilizing the methodologies described herein, improved resiliency for packet loss may be achieved without duplicating packets or requesting that lost packets be resent, both of which introduce latency to data transmission.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 106 and the associated functionality of those components as described herein may be performed by one or more of the electronic devices 102 and/or the receiving devices 104. Additionally, or alternatively, some or all of the components and/or functionalities associated with the electronic devices 102 and/or receiving devices 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 134, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 134, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 134, and/or the processor(s) described with respect to the components of the remote system 106 may possess its own local memory, which also may store program components, program data, and/or one or more operating systems.

The memory 114, 138, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 138, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 138, and/or the memory described with respect to the components of the remote system 106 may be implemented as computer-readable storage media ("CRSM"), which may be any available physical media accessible by the processor(s) 110, 134, and/or the processor(s) described with respect to the remote system 106 to execute instructions stored on the memory 114, 138, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 138, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 136, and/or the network interface(s) described with respect to the components of the remote system 106 may enable messages between the components and/or devices shown in system 100 and/or with one or more other polling systems, as well as other networked devices. Such network interface(s) 112, 136, and/or the network interface(s) described with respect to the components of the remote system 106 may include one or more network interface controllers (NICs) or other types of transceiver devices to send and receive messages over the network 108.

For instance, each of the network interface(s) 112, 136, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 136, and/or the network interface(s) described with respect to the components of the remote system 106 may include a wide area network (WAN) component to enable message over a wide area network.

In some instances, the remote system 106 may be local to an environment associated the electronic devices 102 and/or receiving devices 104. For instance, the remote system 106 may be located within one or more of the electronic devices 102 and/or receiving devices 104. In some instances, some or all of the functionality of the remote system 106 may be performed by one or more of the electronic devices 102 and/or receiving devices 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
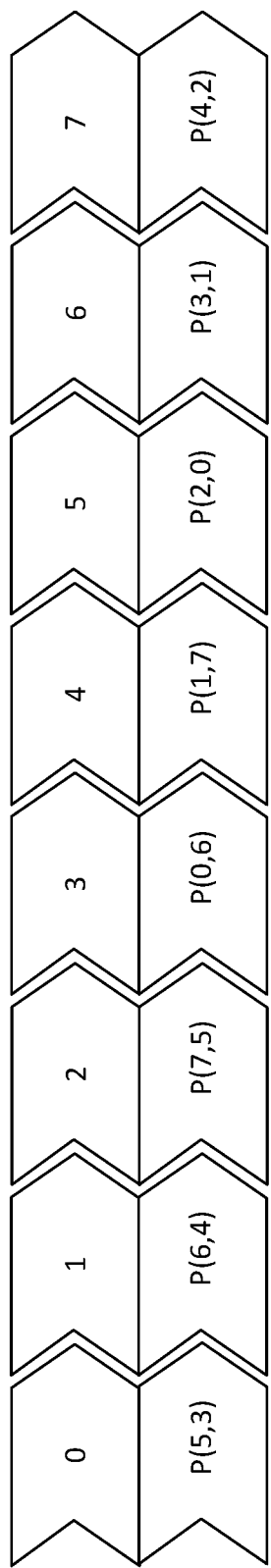
FIG. 2 illustrates a conceptual diagram of data packets generated utilizing a first fragmentation scheme, a first packet spacing scheme, and a single parity slot for improved packet resiliency associated with a wireless data protocol.

FIG. 2 illustrates a conceptual diagram of data packets generated utilizing a first fragmentation scheme, a first packet spacing scheme, and a single parity slot for improved packet resiliency associated with a wireless data protocol. FIG. 2 depicts data packets that each include content data and a packet representation of other data packets. The packet representation has been generated utilizing a packet configuration by a FEC component of an electronic device configured to send the data packets to one or more receiving devices.

As shown in FIG. 2, the selected fragmentation scheme is eight fragments, namely fragments 0-7. Additionally, the packet spacing scheme that has been selected is a packet spacing of 2 packets. Additionally, the parity slot scheme that has been selected is a single parity slot scheme. As discussed more fully above, the selection of this packet configuration may be based at least in part on historical packet loss data and/or user preference and/or one or more default preferences. In this example, for a given fragment, one packet fragment representation may be appended to the given fragment before the fragment is sent to a receiving device. The packet fragment may include Xor data from two other fragments utilizing the 2-packet spacing scheme. For example, fragment 0 may include Xor data for fragments 5 and 3, fragment 1 may include Xor data for fragments 6 and 4, fragment 2 may include Xor data for fragments 7 and 5, fragment 3 may include Xor data for fragments 0 and 6, fragment 4 may include Xor data for fragments 1 and 7, fragment 5 may include Xor data for fragments 2 and 0, fragment 6 may include Xor data for fragments 3 and 1, and fragment 7 may include Xor data for fragments 4 and 2. In this example, the receiving device may have three opportunities to receive a given fragment, namely, when the given fragment is not lost or when at least one of the other fragments with the Xor data for the given fragment is received. For example, if fragment 4 is lost, fragment 4 may be reconstructed if fragment 1 (which includes the Xor data of fragment 4) and fragment 6 are received, and fragment 4 may be reconstructed if fragment 7 (which includes the Xor data of fragment 4) and fragment 2 are received.

Figure 3:
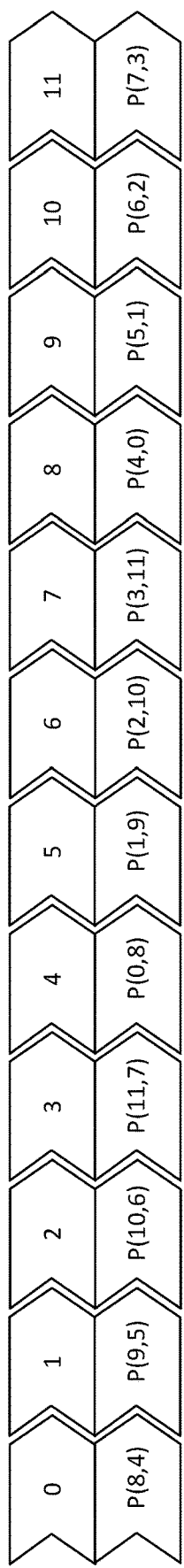
FIG. 3 illustrates a conceptual diagram of data packets generated utilizing a second fragmentation scheme, a second packet spacing scheme, and the single parity slot for improved packet resiliency associated with a wireless data protocol.

FIG. 3 illustrates a conceptual diagram of data packets generated utilizing a second fragmentation scheme, a second packet spacing scheme, and the single parity slot for improved packet resiliency associated with a wireless data protocol. FIG. 3 depicts data packets that each include content data and a packet representation of other data packets. The packet representation has been generated utilizing a packet configuration by a FEC component of an electronic device configured to send the data packets to one or more receiving devices.

As shown in FIG. 3, the selected fragmentation scheme is twelve fragments, namely fragments 0-11. Additionally, the packet spacing scheme that has been selected is a packet spacing of 4 packets. Additionally, the parity slot scheme that has been selected is a single parity slot scheme. As discussed more fully above, the selection of this packet configuration may be based at least in part on historical packet loss data and/or user preference and/or one or more default preferences. In this example, for a given fragment, one packet fragment representation may be appended to the given fragment before the fragment is sent to a receiving device. The packet fragment may include Xor data from two other fragments utilizing the 4-packet spacing scheme. For example, fragment 0 may include Xor data for fragments 8 and 4, fragment 1 may include Xor data for fragments 9 and 5, fragment 2 may include Xor data for fragments 10 and 6, fragment 3 may include Xor data for fragments 11 and 7, fragment 4 may include Xor data for fragments 0 and 8, fragment 5 may include Xor data for fragments 1 and 9, fragment 6 may include Xor data for fragments 2 and 10, and fragment 7 may include Xor data for fragments 3 and 11, fragment 8 may include Xor data for fragments 4 and 0, fragment 9 may include Xor data for fragments 5 and 1, fragment 10 may include Xor data for fragments 6 and 2, and fragment 11 may include Xor data for fragments 7 and 3. In this example, the receiving device may have three opportunities to receive a given fragment, namely, when the given fragment is not lost or when at least one of the other fragments with the Xor data for the given fragment is received. For example, if fragment 3 is lost, fragment 3 may be reconstructed if fragment 7 (which includes the Xor data of fragment 3) and fragment 11 are received, and fragment 3 may be reconstructed if fragment 11 (which includes the Xor data of fragment 3) and fragment 7 are received.

Figure 4:
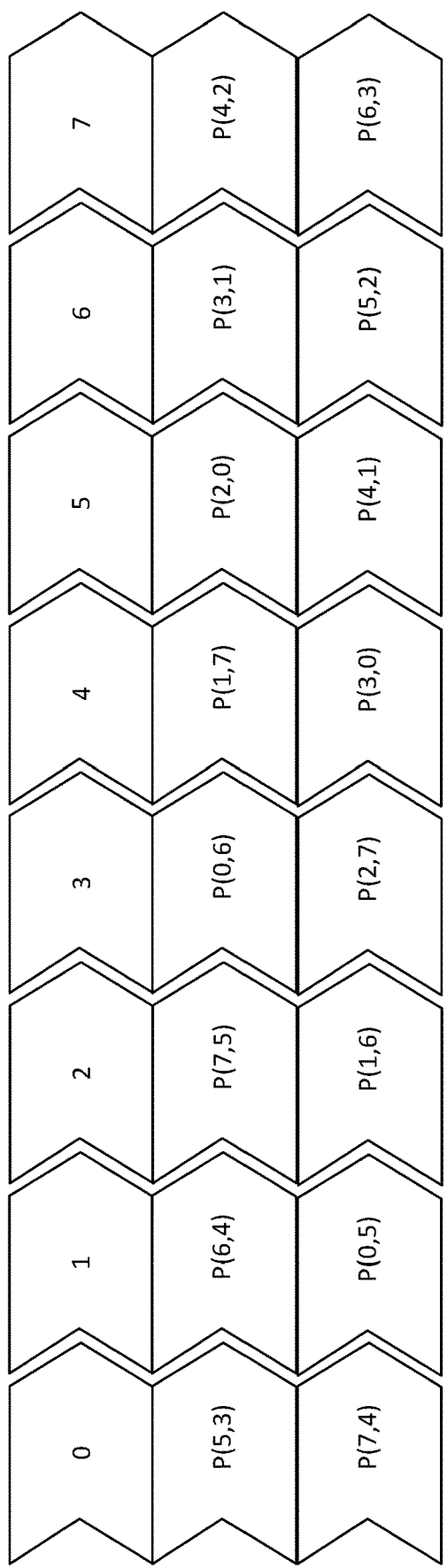
FIG. 4 illustrates a conceptual diagram of data packets generated utilizing the first fragmentation scheme and multiple parity slots having differing packet spacing schemes for improved packet resiliency associated with a wireless data protocol.

FIG. 4 illustrates a conceptual diagram of data packets generated utilizing the first fragmentation scheme and multiple parity slots having differing packet spacing schemes for improved packet resiliency associated with a wireless data protocol. FIG. 4 depicts data packets that each include content data and a packet representation of other data packets. The packet representation has been generated utilizing a packet configuration by a FEC component of an electronic device configured to send the data packets to one or more receiving devices.

As shown in FIG. 4, the selected fragmentation scheme is eight fragments, namely fragments 0-7. Additionally, the packet spacing scheme that has been selected is a packet spacing of 2 packets for a first parity slot and a packet spacing of 5 packets for a second parity slot. As discussed more fully above, the selection of this packet configuration may be based at least in part on historical packet loss data and/or user preference and/or one or more default preferences. In this example, for a given fragment, one packet fragment representation may be appended to the given fragment before the fragment is sent to a receiving device. The packet fragment may include Xor data from four other fragments, with the Xor data from two fragments in a first parity slot and the Xor data from the other two fragments in a second parity slot. For the first parity slot, which in this example is utilizing a packet spacing of 2 packets, fragment 0 may include Xor data for fragments 5 and 3, fragment 1 may include Xor data for fragments 6 and 4, fragment 2 may include Xor data for fragments 7 and 5, fragment 3 may include Xor data for fragments 0 and 6, fragment 4 may include Xor data for fragments 1 and 7, fragment 5 may include Xor data for fragments 2 and 0, fragment 6 may include Xor data for fragments 3 and 1, and fragment 7 may include Xor data for fragments 4 and 2. For the second parity slot, which in this example is utilizing a packet spacing of 5 packets, fragment 0 may include Xor data for fragments 7 and 4, fragment 1 may include Xor data for fragments 0 and 5, fragment 2 may include Xor data for fragments 1 and 6, fragment 3 may include Xor data for fragments 2 and 7, fragment 4 may include Xor data for fragments 3 and 0, fragment 5 may include Xor data for fragments 4 and 1, fragment 6 may include Xor data for fragments 5 and 2, and fragment 7 may include Xor data for fragments 6 and 3. In this example, the receiving device may have five opportunities to receive a given fragment, namely, when the given fragment is not lost or when at least one of the other fragments with the Xor data for the given fragment is received. For example, if fragment 4 is lost, fragment 4 may be reconstructed if fragment 1 (which includes the Xor data of fragment 4) and fragment 6 are received, fragment 4 may be reconstructed if fragment 7 (which includes the Xor data of fragment 4) and fragment 2 are received, fragment 4 may be reconstructed if fragment 0 (which includes the Xor data for fragment 4) and fragment 7 are received, and fragment 4 may be reconstructed if fragment 5 (which includes the Xor data for fragment 4) and fragment 1 are received.

Figure 5:
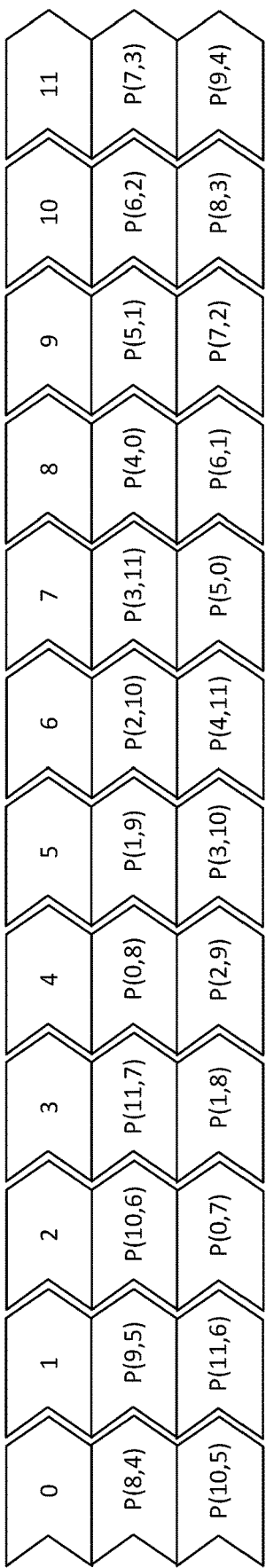
FIG. 5 illustrates a conceptual diagram of data packets generated utilizing the second fragmentation scheme and multiple parity slots having differing packet spacing schemes for improved packet resiliency associated with a wireless data protocol.

FIG. 5 illustrates a conceptual diagram of data packets generated utilizing the second fragmentation scheme and multiple parity slots having differing packet spacing schemes for improved packet resiliency associated with a wireless data protocol. FIG. 5 depicts data packets that each include content data and a packet representation of other data packets. The packet representation has been generated utilizing a packet configuration by a FEC component of an electronic device configured to send the data packets to one or more receiving devices.

As shown in FIG. 5, the selected fragmentation scheme is twelve fragments, namely fragments 0-11. Additionally, the packet spacing scheme that has been selected is a packet spacing of 4 packets for a first parity slot and a packet spacing of 5 packets for a second parity slot. As discussed more fully above, the selection of this packet configuration may be based at least in part on historical packet loss data and/or user preference and/or one or more default preferences. In this example, for a given fragment, one packet fragment representation may be appended to the given fragment before the fragment is sent to a receiving device. The packet fragment may include Xor data from two other fragments utilizing the 4-packet spacing scheme for the first parity slot. For example, fragment 0 may include Xor data for fragments 8 and 4, fragment 1 may include Xor data for fragments 9 and 5, fragment 2 may include Xor data for fragments 10 and 6, fragment 3 may include Xor data for fragments 11 and 7, fragment 4 may include Xor data for fragments 0 and 8, fragment 5 may include Xor data for fragments 1 and 9, fragment 6 may include Xor data for fragments 2 and 10, and fragment 7 may include Xor data for fragments 3 and 11, fragment 8 may include Xor data for fragments 4 and 0, fragment 9 may include Xor data for fragments 5 and 1, fragment 10 may include Xor data for fragments 6 and 2, and fragment 11 may include Xor data for fragments 7 and 3. For the second parity slot, the packet spacing may be 5 packets. For example, fragment 0 may include Xor data for fragments 10 and 5, fragment 1 may include Xor data for fragments 11 and 6, fragment 2 may include Xor data for fragments 0 and 7, fragment 3 may include Xor data for fragments 1 and 8, fragment 4 may include Xor data for fragments 2 and 9, fragment 5 may include Xor data for fragments 3 and 10, fragment 6 may include Xor data for fragments 4 and 11, and fragment 7 may include Xor data for fragments 5 and 0, fragment 8 may include Xor data for fragments 6 and 1, fragment 10 may include Xor data for fragments 7 and 2, fragment 10 may include Xor data for fragments 8 and 3, and fragment 11 may include Xor data for fragments 9 and 4. In this example, the receiving device may have five opportunities to receive a given fragment, namely, when the given fragment is not lost or when at least one of the other fragments with the Xor data for the given fragment is received. For example, if fragment 3 is lost, fragment 3 may be reconstructed if fragment 7 (which includes the Xor data of fragment 3) and fragment 11 are received, fragment 3 may be reconstructed if fragment 11 (which includes the Xor data of fragment 3) and fragment 7 are received, fragment 3 may be reconstructed if fragment 5 (which includes the Xor data for fragment 3) and fragment 10 are received, and fragment 3 may be reconstructed if fragment 10 (which includes the Xor data for fragment 3) and fragment 8 are received.

Figure 6A:
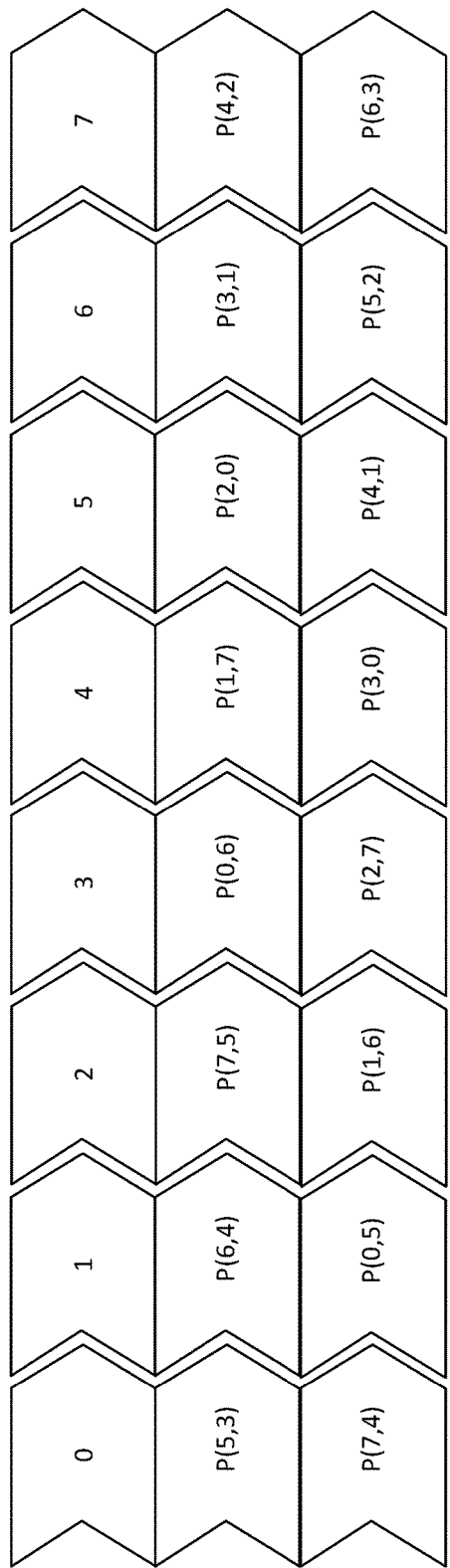
FIG. 6A illustrates a conceptual diagram of data packets having a given fragmentation scheme and utilizing multiple parity slots with a first packet spacing scheme.

FIG. 6A illustrates a conceptual diagram of data packets having a given fragmentation scheme and utilizing multiple parity slots with a first packet spacing scheme. For example, the packet configuration of FIG. 6A includes two parity slots, with each parity slot being associated with a given packet spacing. For example, the first parity slot is associated with a packet spacing of 2 packets. The second parity slot is associated with a packet spacing of 5 packets. It should be understood that different packet spacings may be utilized than the two packet spacing schemes utilized for this example. These packet spacings may be determined based at least in part on the fragmentation scheme used, historical packet loss data, and/or whether a single parity slot or multiple parity slots are utilized.

Figure 6B:
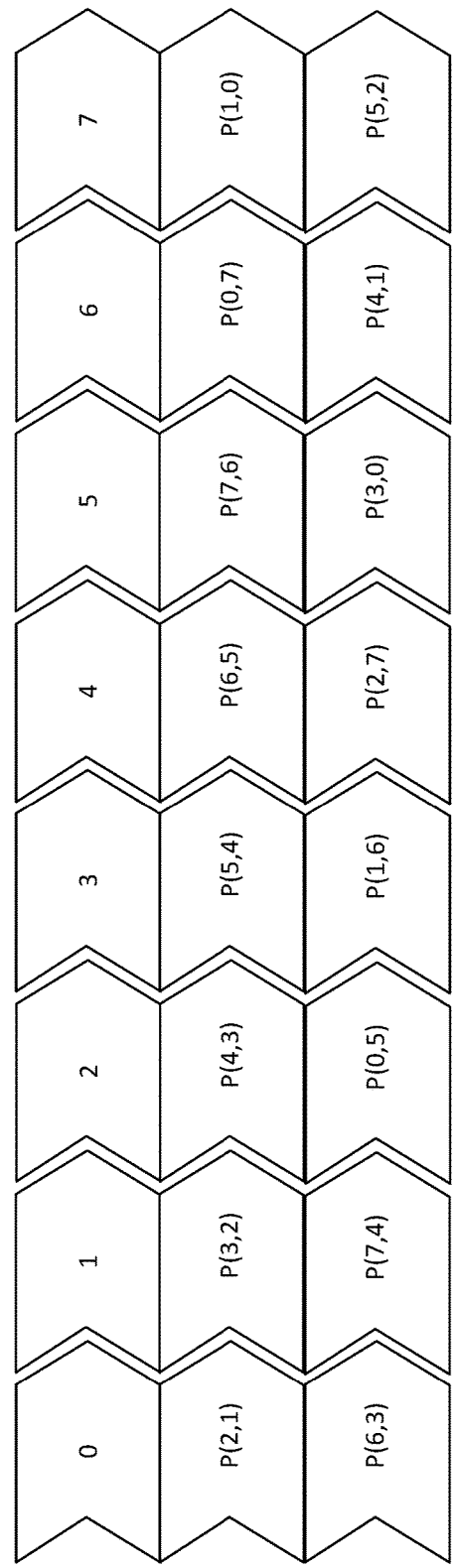
FIG. 6B illustrates a conceptual diagram of data packets having the same fragmentation scheme and parity slots as FIG. 6A, but with a second packet spacing scheme.

FIG. 6B illustrates a conceptual diagram of data packets having the same fragmentation scheme and parity slots as FIG. 6A, but with a second packet spacing scheme. For example, the packet configuration of FIG. 6B includes two parity slots, with each parity slot being associated with a given packet spacing. For example, the first parity slot is associated with a packet spacing of 1 packet. The second parity slot is associated with a packet spacing of 2 packets. It should be understood that different packet spacings may be utilized than the two packet spacing schemes utilized for this example. These packet spacings may be determined based at least in part on the fragmentation scheme used, historical packet loss data, and/or whether a single parity slot or multiple parity slots are utilized.

FIG. 7 illustrates a chart indicating packet fragment recovery when a single parity slot is utilized and when multiple parity slots are utilized. The chart illustrates an example where a fragmentation scheme of eight fragments for each high bit rate packet is utilized. The chart illustrates examples of when a given number of packet fragments are received at a receiving device and a corresponding number of lost fragments. In this example, when all eight fragments are received, 0 fragments are lost, when 7 fragments are received, 1 fragment is lost, and so on.

FIG. 7 also illustrates two different parity slot configurations. One configuration is associated with a single parity slot while another configuration is associated with two parity slots. The column "Fragments Recovered 1 Parity Slot" illustrates how many packet fragments may be recovered when a given number of those fragments are lost. The column "Fragments Recovered 2 Parity Slots" illustrates how many packet fragments may be recovered when the given number of fragments are lost. The right-most column indicates the total potential correction possibilities when a given number of fragments is lost.

As can be seen in FIG. 7, when all 8 fragments are received, 0 fragments are lost and all fragments are considered recovered. When 7 fragments are received, 1 fragment is lost and in both the one-parity-slot configuration and the two-parity-slot configuration regardless of which of the fragments is lost the receiving device will be able to recover the lost fragment. When 6 fragments are received, 2 fragments are lost and again in both the one-parity-slot configuration and the two-parity-slot configuration regardless of which of the fragments is lost the receiving device will be able to recover the lost fragments.

However, when 3 or more fragments are lost, the differences between the parity slot configurations begin to occur. For example, when 5 fragments are received, 3 fragments are lost. In this instance, only 48 of 56 correction possibilities will be recoverable in the one-parity-slot configuration. To the contrary, the two-parity-slot configuration allows for all 56 correction possibilities to be realized. As such, when a two-parity-slot configuration is utilized, even if 3 of the 8 fragments are lost, the entire high bit rate data packet can be recovered and utilized. The same holds true when 4 fragments are received and thus 4 fragments are lost. In this example, the one-parity-slot configuration allows for only 28 of the 70 correction possibilities to be realized, while the two-parity-slot configuration allows for all 70 of the correction possibilities to be realized.

When only 3 fragments are received at the received device, 5 fragments are lost. In this instance, none of the 56 correction possibilities can be realized using a one-parity-slot configuration. However, 48 of the 56 correction possibilities can be realized using a two-parity-slot configuration. If 2 or fewer packets are received, neither the one-parity-slot configuration nor the two-parity slot configuration may be utilized to recover any of the lost fragments.

In sum, the one-parity-slot configuration may be utilized to recover 113 of 256 correction possibilities, while the two-parity-slot configuration may be utilized to recover 211 of the 256 correction possibilities. As such, the two-parity-slot configuration may be considered a more robust solution for recovering fragments. However, the increased correction possibilities also comes with a bandwidth cost of roughly 50% more than the one-parity-slot configuration given that each fragment includes two packet fragment representations instead of just one packet fragment representation.

It should be understood that the data presented in FIG. 7 is by way of example, and other packet configurations from the configuration associated with FIG. 7 may result in different correction possibilities and fragment recovery occurrences. For example, in FIG. 7 the fragmentation scheme is an eight-fragment scheme. The use of a twelve-fragment scheme may result in differing correction possibilities and fragment recovery occurrences both in total and with respect to how many fragments are lost for a given packet.

Figure 8:
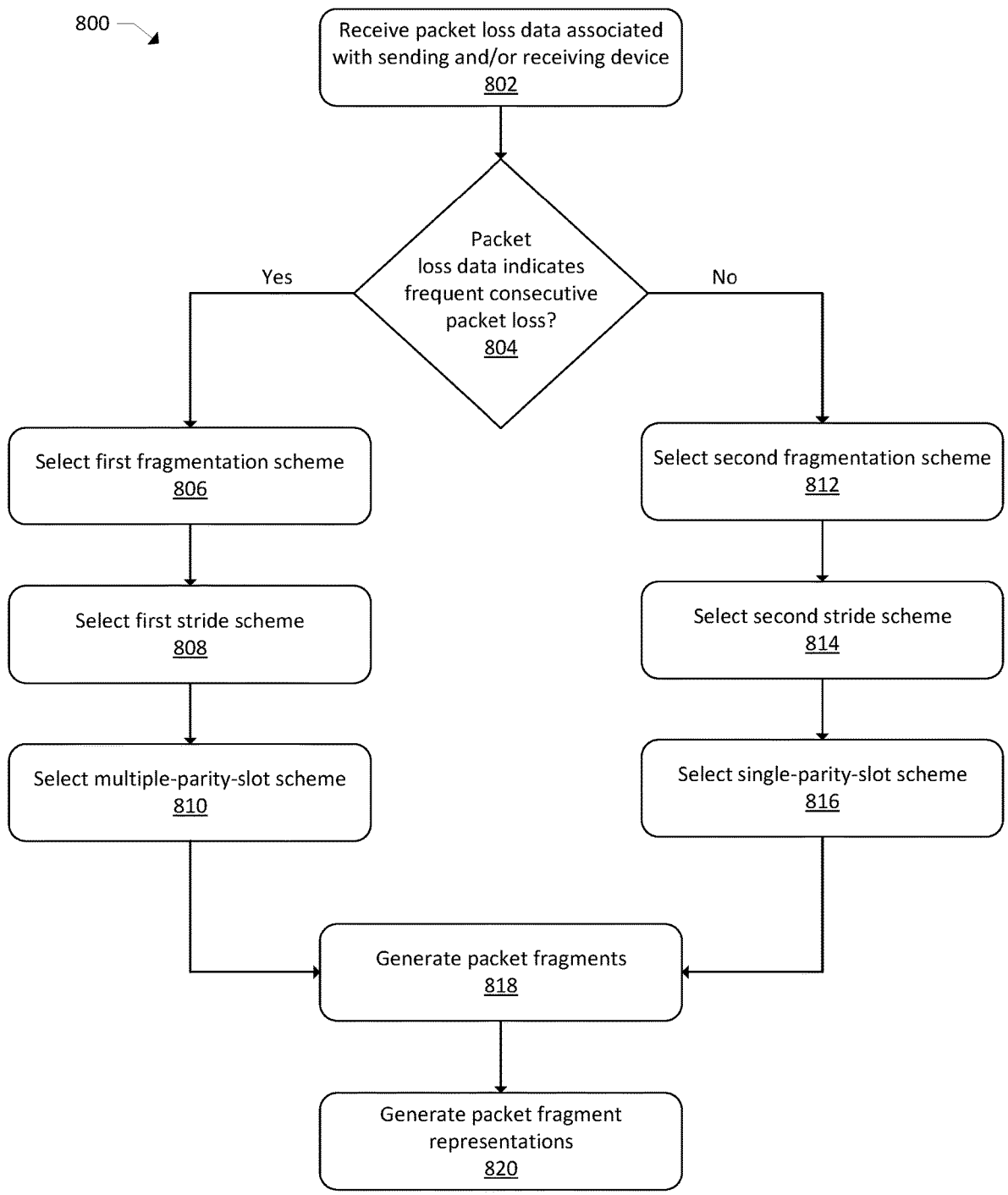
FIG. 8 illustrates a flow diagram of an example process for selecting a fragmentation scheme, a packet spacing scheme, and a number of parity slots to utilize for generating data packets.
Figure 9:
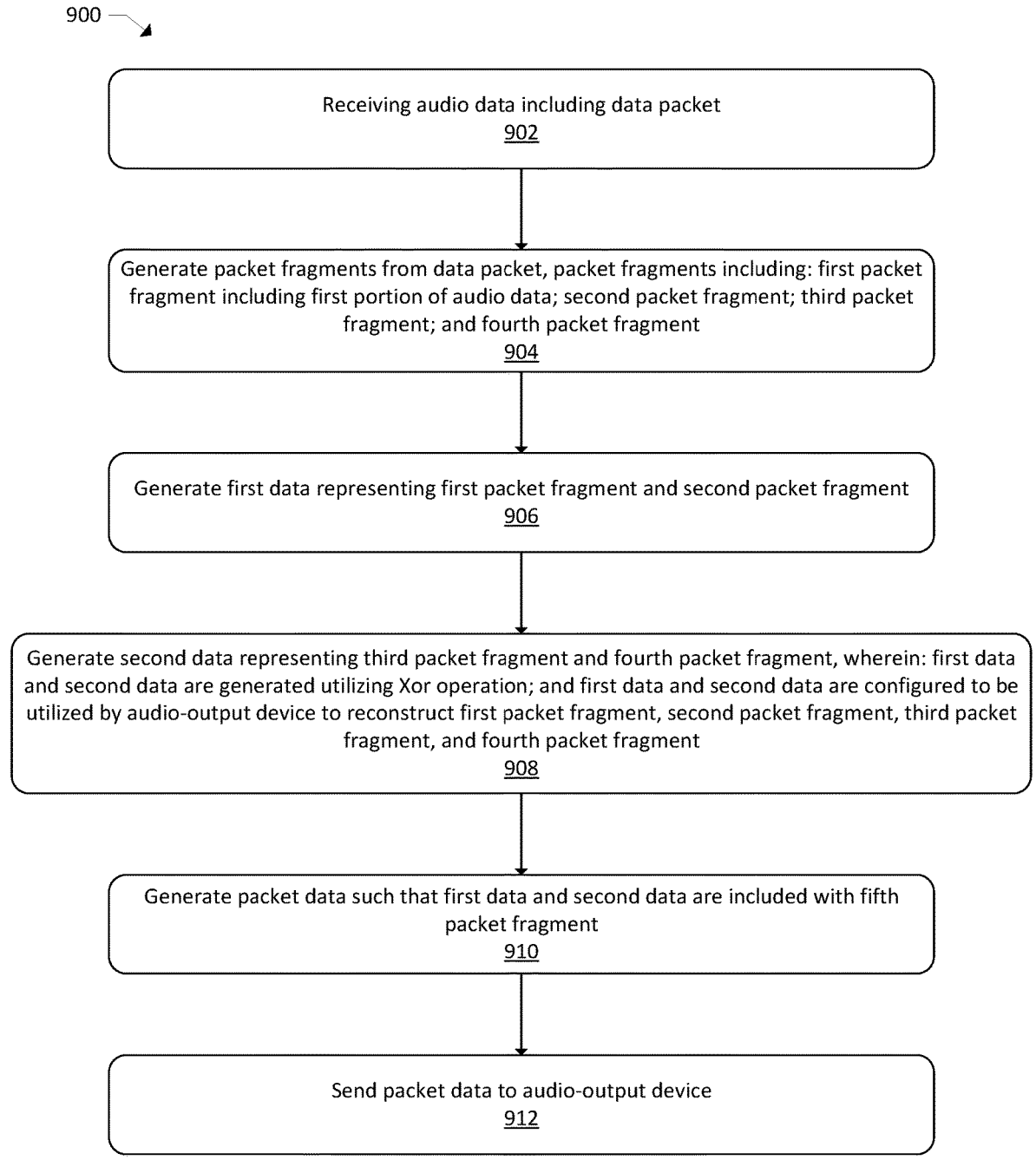
FIG. 9 illustrates a flow diagram of an example process for improved packet resiliency associated with a wireless data protocol.
Figure 10:
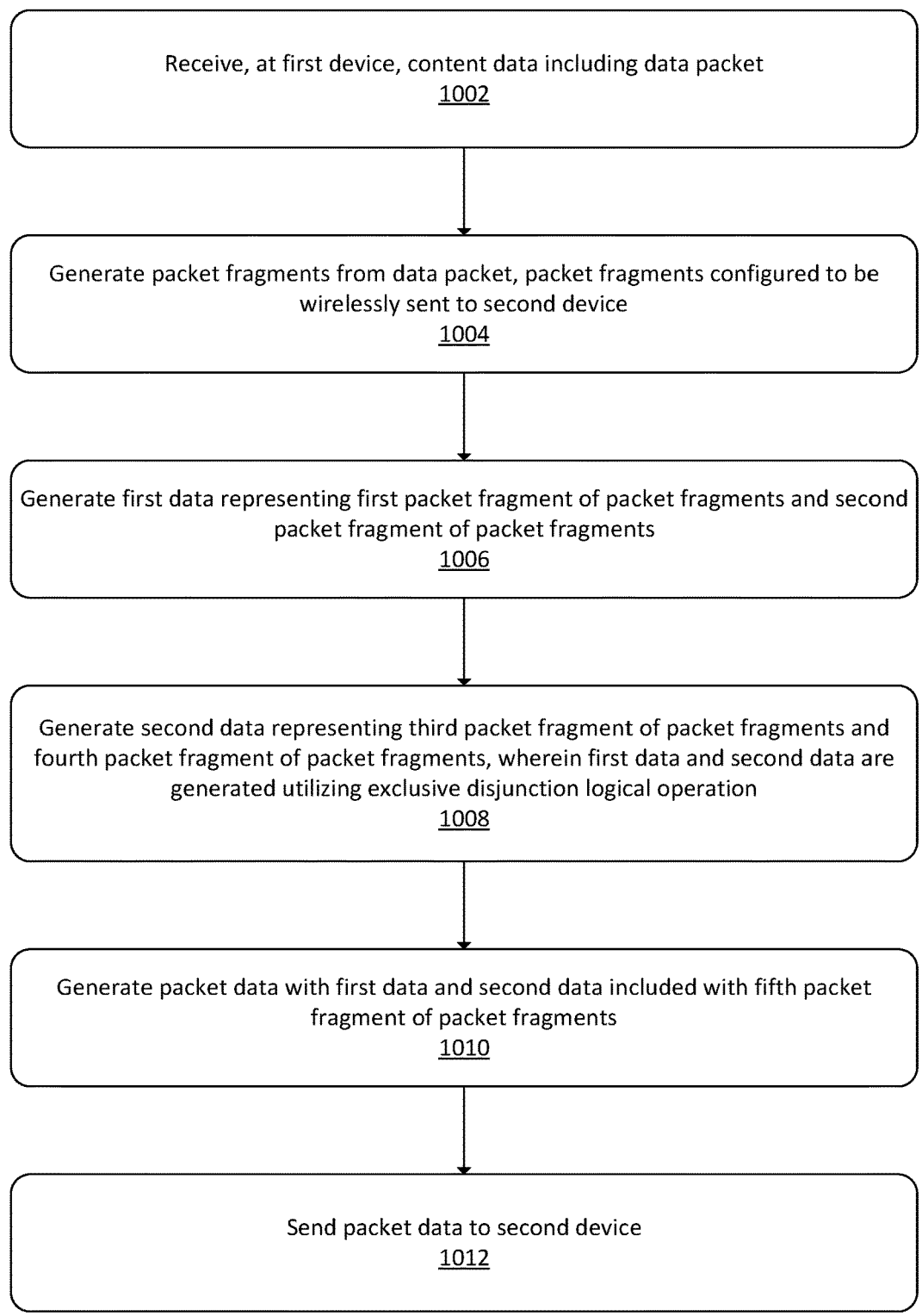
FIG. 10 illustrates a flow diagram of another example process for improved packet resiliency associated with a wireless data protocol.

FIGS. 8-10 illustrate processes for improved packet resiliency associated with a wireless data protocol. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 11-15, although the processes may be implemented in a wide variety of other environments, architectures and systems.

FIG. 8 illustrates a flow diagram of an example process 800 for selecting a fragmentation scheme, a packet spacing scheme, and a number of parity slots to utilize for generating data packets. The order in which the operations or steps are described is not intended to be construed as a limitation, and any number of the described operations may be combined in any order and/or in parallel to implement process 800.

At block 802, the process 800 may include receiving packet loss data associated with a sending device and/or a receiving device. For example, a feedback component of the electronic device may be utilized to receive packet-loss data from one or more sources, such as from the receiving device(s) and/or from a remote system. For example, the receiving device(s) may determine which packets are lost from the electronic device. By way of example, each packet may be consecutively numbered and data indicating that numbering may be included in the header portion of the packets. The receiving device(s) may utilize that data to determine an ordering of the packets, such as for correct output of audio when the content data includes audio data. If a packet is lost and/or is not received in time to be utilized for output by the receiving device(s), the receiving device(s) may determine that the received packets do not include at least one of the consecutively-numbered packets. This packet-loss data may be sent to the electronic device, which may utilize this information to select packet configurations.

At block 804, the process 800 may include determining whether the packet loss data indicates frequent consecutive packet loss. For example, the packet-loss data may indicate that two packets are consecutively lost frequently, such as more than a threshold amount of times, that three or more packets are consecutively lost frequently, and/or that packets are not consecutively lost frequently. The electronic device may receive this packet-loss data and utilize the data to select a packet configuration.

In instances where the packet loss data indicates frequent consecutive packet loss, the process 800 may include, at block 806, selecting a first fragmentation scheme. For example, when two or more packets are consecutively lost frequently, and/or when the total number of lost fragments for high bit rate packets satisfies a threshold number, the FEC component may select a packet configuration where increased fragmentation occurs. This increased fragmentation may include fragmenting high bit rate packets into twelve fragments instead of eight fragments.

At block 808, the process 800 may include selecting a first packet spacing scheme. For example, when two or more packets are consecutively lost frequently, and/or when the total number of lost fragments for high bit rate packets satisfies a threshold number, the FEC component may select a packet configuration where an increased stride is utilized to allow for more spacing between a given fragment and other fragments for which Xor data is generated for appending to the given fragment.

At block 810, the process 800 may include selecting a multiple-parity-slot scheme. For example, when two or more packets are consecutively lost frequently, and/or when the total number of lost fragments for high bit rate packets satisfies a threshold number, the FEC component may select a packet configuration where a two-parity-slot configuration is utilized, which may provide for greater correction possibilities as discussed with respect to FIG. 7.

Returning to block 806, in instances where the packet loss data does not indicate that packets are frequently consecutively lost, the process 800 may include, at block 812, selecting a second fragmentation scheme. For example, when two or more packets are not consecutively lost frequently the FEC component may select a packet configuration where a fragmentation scheme of eight fragments is utilized instead of twelve fragments, which may reduce latency and/or compute time.

At block 814, the process 800 may include selecting a second packet spacing scheme. For example, when two or more packets are not consecutively lost frequently the FEC component may select a packet configuration where a decreased stride is utilized, which may allow for the receiving device to more quickly reconstruct lost packets because the receiving device may not need to wait for the same number of fragments to arrive when a larger stride is utilized.

At block 816, the process 800 may include selecting a single-parity-slot scheme. For example, when two or more packets are not consecutively lost frequently and/or when few fragments are lost per high bit rate packet, the FEC component may select a packet configuration where a one-parity-slot configuration is utilized. For example, if few fragments are lost, the one-parity-slot configuration may be sufficient to recover lost fragments while reducing the bandwidth as compared to a two-parity-slot configuration by 33%.

At block 818, the process 800 may include generating packet fragments utilizing the selected fragmentation scheme. For example, a high bit rate packet may be fragmented into the number of fragments associated with the selected fragmentation scheme such that the content of the high bit rate packet is divided amongst the number of fragments.

At block 820, the process 800 may include generating packet fragment representations utilizing the selected packet spacing scheme and parity slot scheme. For example, packet fragment representation(s) may be generated to be appended to each packet fragment. The packet fragment representation(s) may be generated utilizing the packet spacing scheme to determine which fragments to generate Xor data for for appending to a given fragment, and a number of packet fragment representations to be appended to each fragment may be determined utilizing the parity slot scheme.

FIG. 9 illustrates a flow diagram of an example process for improved packet resiliency associated with a wireless data protocol. The order in which the operations or steps are described is not intended to be construed as a limitation, and any number of the described operations may be combined in any order and/or in parallel to implement process 900.

At block 902, the process 900 may include receiving audio data including a data packet. For example, a content component of the electronic device may be configured to receive content data that is to be sent to the receiving device(s). That content data may be received, for example, from a remote system configured to provide the content data, such as in response to a user request for such content data. The user request may be in the form of a voice command, such as when the electronic device includes a voice user interface, and/or in the form of user input data corresponding to user input received at, for example, a graphical user interface of the electronic device. The content data may be received in high bit rate packets. In examples, the audio data packets may be any packets with a number of bytes greater than a maximum transmission unit utilized when sending data via internet protocols such the transmission control protocol (TCP) or the user datagram protocol (UDP).

At block 904, the process 900 may include generating packet fragments from the data packet, the packet fragments including at least: a first packet fragment including a first portion of the audio data; a second packet fragment; a third packet fragment; and a fourth packet fragment. For example, a high bit rate packet may be fragmented into two or more fragments, each including a portion of the content data from the high bit rate packet. Two example fragmentation schemes, an eight-fragment scheme and a twelve-fragment scheme, will be used throughout this disclosure by way of illustration. However, it should be understood that these examples are nonlimiting and this disclosure includes fragmentation schemes where packets are fragmented into two or more fragments. In some examples, such as based at least in part on the historical packet loss data, the FEC component may determine that the eight-fragment scheme is preferable because packet loss does not frequently occur. In other examples, the twelve-fragment scheme may be preferable, such as when packets are frequently lost and/or when the type of content associated with the high bit rate packet allows for greater latency in the increased fragmentation of the packet and subsequent increase in number of packet fragment representations to be generated.

At block 906, the process 900 may include generating first data representing the first packet fragment and the second packet fragment. For example, the first data may be considered packet fragment representation(s) and may be generated to be appended to each packet fragment. The packet fragment representation(s) may be generated utilizing a packet spacing scheme to determine which fragments to generate Xor data for for appending to a given fragment, and a number of packet fragment representations to be appended to each fragment may be determined utilizing the parity slot scheme.

At block 908, the process 900 may include generating second data representing the third packet fragment and the fourth packet fragment, wherein: the first data and the second data are generated utilizing an Xor operation; and the first data and the second data are configured to be utilized by an audio-output device to reconstruct the first packet fragment, the second packet fragment, the third packet fragment, and the fourth packet fragment. The second data may correspond to a packet fragment representation and may be generated in the same or a similar manner as generation of the first packet fragment representation, except that the packet spacing scheme may differ from the packet spacing scheme utilized for generating the first packet fragment representation.

At block 910, the process 900 may include generating packet data such that the first data and the second data are included with a fifth packet fragment. For example, a data packet for the fragment may be generated that includes the content data from the packet fragment as well as the first packet fragment representation and the second packet fragment representation appended to the content data.

At block 912, the process 900 may include sending the packet data to the audio-output device. For example, the packet data may be sent to a received device that is configured to receive the packet data and reconstruct packet fragments when lost. For example, a recovery component of the receiving device may be configured to determine when and which packets are lost and to attempt to recover or otherwise reconstruct those packets. For example, the data packets may be sent from the electronic device utilizing a packet configuration having a packet spacing of 3. If the lost packet, for example, is fragment 3, then the recovery component may attempt to utilize the Xor data and the other packets to recover fragment 3. For example, the recovery component may utilize the Xor data from fragment 0 and/or fragment 6 as well as the content data from fragment 5 and/or fragment 1 to reconstruct the content data from fragment 3. In this example, the recovery component may have two opportunities to reconstruct fragment 3. In examples where multiple parity slots are utilized, there may be four opportunities to reconstruct a given fragment. For example, when the first parity slot has a packet spacing of 2 and the second parity slot has a packet spacing of 5, each packet fragment may include Xor data associated with four other fragments. In this example, if fragment 3 is lost, the Xor data from fragment 0 and 6 (in the first parity slot) and fragments 4 and 7 (in the second parity slot) may be utilized to reconstruct fragment 3. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission.

Additionally, or alternatively, the process 900 may include determining, utilizing third data indicating historical packet loss associated with the audio-output device, that consecutive packet loss occurs more than non-consecutive packet loss at the audio-output device. The process 900 may also include after determining that consecutive packet loss occurs more than non-consecutive packet loss, determining a packet configuration to utilize in association with generating the first data and the second data, the packet configuration indicating that: the first packet fragment and the second packet fragment have a first number of packet fragments between the first packet fragment and the fifth packet fragment and between the second packet fragment and the fifth packet fragment; and the third packet fragment and the fourth packet fragment are associated with a second number of packet fragments between the third packet fragment and the fifth packet fragment and between the fourth packet fragment and the fifth packet fragment, the second number of packet fragments differing from the first number of packet fragments.

Additionally, or alternatively, the process 900 may include determining, utilizing third data indicating historical packet loss associated with the audio-output device, that consecutive packet loss occurs more than non-consecutive packet loss at the audio-output device. The process 900 may also include selecting, from determining that consecutive packet loss occurs more than non-consecutive packet loss, a fragmentation configuration to utilize in association with generating the packet fragments, the fragmentation configuration indicating that the data packet is to be fragmented into a larger number of fragments than when non-consecutive packet loss occurs more than consecutive packet loss.

Additionally, or alternatively, the process 900 may include determining, utilizing third data indicating historical packet loss associated with the audio-output device, that non-consecutive packet loss occurs more than consecutive packet loss at the audio-output device. The process 900 may also include configuring the device to generate the first data instead of the first data and the second data to associate with future data packets when sent to the audio-output device.

FIG. 10 illustrates a flow diagram of another example process for improved packet resiliency associated with a wireless data protocol. The order in which the operations or steps are described is not intended to be construed as a limitation, and any number of the described operations may be combined in any order and/or in parallel to implement process 1000.

At block 1002, the process 1000 may include receiving, at a first device, content data including a data packet. For example, a content component of the electronic device may be configured to receive content data that is to be sent to the receiving device(s). That content data may be received, for example, from a remote system configured to provide the content data, such as in response to a user request for such content data. The user request may be in the form of a voice command, such as when the electronic device includes a voice user interface, and/or in the form of user input data corresponding to user input received at, for example, a graphical user interface of the electronic device. The content data may be received in high bit rate packets.

At block 1004, the process 1000 may include generating packet fragments from the data packet, the packet fragments configured to be wirelessly sent to a second device. For example, a high bit rate packet may be fragmented into two or more fragments, each including a portion of the content data from the high bit rate packet. Two example fragmentation schemes, an eight-fragment scheme and a twelve-fragment scheme, will be used throughout this disclosure by way of illustration. However, it should be understood that these examples are nonlimiting and this disclosure includes fragmentation schemes where packets are fragmented into two or more fragments. In some examples, such as based at least in part on the historical packet loss data, the FEC component may determine that the eight-fragment scheme is preferable because packet loss does not frequently occur. In other examples, the twelve-fragment scheme may be preferable, such as when packets are frequently lost and/or when the type of content associated with the high bit rate packet allows for greater latency in the increased fragmentation of the packet and subsequent increase in number of packet fragment representations to be generated.

At block 1006, the process 1000 may include generating first data representing a first packet fragment of the packet fragments and a second packet fragment of the packet fragments. For example, the first data may correspond to packet fragment representation(s) and may be generated to be appended to each packet fragment. The packet fragment representation(s) may be generated utilizing a packet spacing scheme to determine which fragments to generate Xor data for for appending to a given fragment, and a number of packet fragment representations to be appended to each fragment may be determined utilizing the parity slot scheme.

At block 1008, the process 1000 may include generating second data representing a third packet fragment of the packet fragments and a fourth packet fragment of the packet fragments, wherein the first data and the second data are generated utilizing an exclusive disjunction logical operation. The second data may correspond to a second packet fragment representation and may be generated in the same or a similar manner as generation of the first packet fragment representation, except that the packet spacing scheme may differ from the packet spacing scheme utilized for generating the first packet fragment representation.

At block 1010, the process 1000 may include generating packet data with the first data and the second data included with a fifth packet fragment of the packet fragments. For example, a data packet for the fragment may be generated that includes the content data from the packet fragment as well as the first packet fragment representation and the second packet fragment representation appended to the content data.

At block 1012, the process 1000 may include sending the packet data to the second device. For example, the packet data may be sent to a received device that is configured to receive the packet data and reconstruct packet fragments when lost. For example, a recovery component of the receiving device may be configured to determine when and which packets are lost and to attempt to recover or otherwise reconstruct those packets. For example, the data packets may be sent from the electronic device utilizing a packet configuration having a packet spacing of 3. If the lost packet, for example, is fragment 3, then the recovery component may attempt to utilize the Xor data and the other packets to recover fragment 3. For example, the recovery component may utilize the Xor data from fragment 0 and/or fragment 6 as well as the content data from fragment 5 and/or fragment 1 to reconstruct the content data from fragment 3. In this example, the recovery component may have two opportunities to reconstruct fragment 3. In examples where multiple parity slots are utilized, there may be four opportunities to reconstruct a given fragment. For example, when the first parity slot has a packet spacing of 2 and the second parity slot has a packet spacing of 5, each packet fragment may include Xor data associated with four other fragments. In this example, if fragment 3 is lost, the Xor data from fragment 0 and 6 (in the first parity slot) and fragments 4 and 7 (in the second parity slot) may be utilized to reconstruct fragment 3. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission.

Additionally, or alternatively, the process 1000 may include receiving third data indicating that consecutive packet loss occurs more than non-consecutive packet loss at the second device. The process 1000 may also include determining, based at least in part on the third data, that: the first packet fragment and the second packet fragment are a first number of packet fragments from the fifth packet fragment; and the third packet fragment and the fourth packet fragment are a second number of packet fragments from the fifth packet fragment, the second number of packet fragments differing from the first number of packet fragments.

Additionally, or alternatively, the process 1000 may include receiving third data indicating that consecutive packet loss occurs more than non-consecutive packet loss at the second device. The process 1000 may also include determining, based at least in part on the third data, that the data packet is to be fragmented into a larger number of fragments than when non-consecutive packet loss occurs more than consecutive packet loss.

Additionally, or alternatively, the process 1000 may include receiving third data indicating that non-consecutive packet loss occurs more than consecutive packet loss at the second device. The process 1000 may also include configuring, based at least in part on the third data, the first device to generate the first data instead of the first data and the second data to associate with data packets when sent to the second device.

Additionally, or alternatively, the process 1000 may include receiving third data indicating that at least a threshold number of packet fragments of previously-sent data packets are lost at the second device. The process 1000 may also include selecting a configuration for generating the first data and the second data, the configuration indicating that at least the first data and the second data are to be generated for the second packet fragment. In these examples, generating the second data may be based at least in part on the configuration.

Additionally, or alternatively, the process 1000 may include determining an association between sequential ones of the packet fragments, wherein a last packet fragment of the packet fragments is associated with the first packet fragment such that the first packet fragment follows the last packet fragment. The process 1000 may also include generating a packet fragment representation for each of the packet fragments based at least in part on the association. It should be understood that the circular linking described herein need not be between first and last fragment for a given fragmentation scheme. The linking described herein may depend on the stride scheme that has been determined.

Additionally, or alternatively, the process 1000 may include determining that a third device has been configured to output a first instance of content corresponding to the content data while the second device outputs a second instance of the content. The process 1000 may also include sending, to the third device and based at least in part on the third device being configured to output the first instance of the content while the second device output the second instance of the content, the packet data including the first data and the second data.

Figure 11:
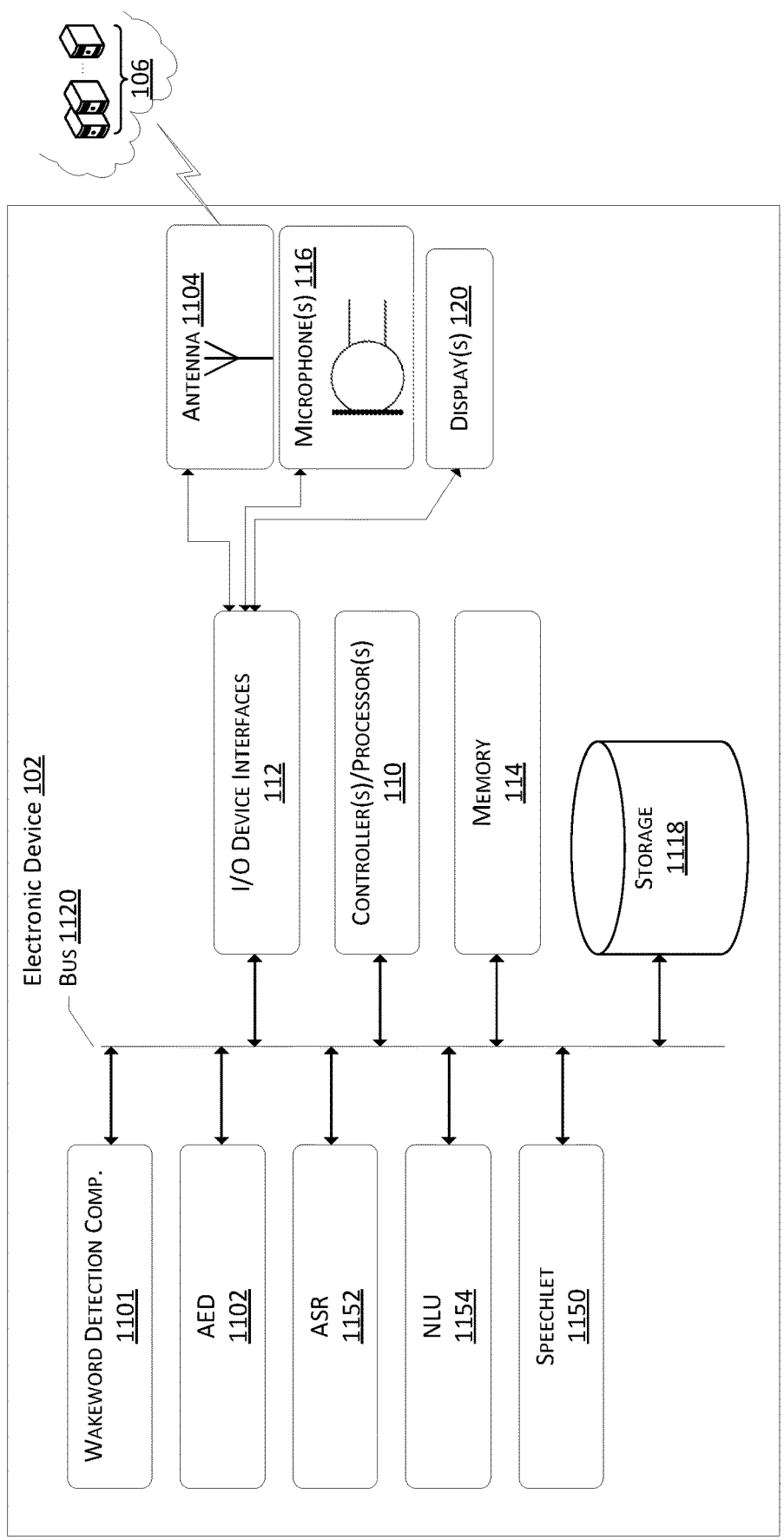
FIG. 11 illustrates a conceptual diagram of example components of an electronic device that may be utilized in association with improved packet resiliency associated with a wireless data protocol.

FIG. 11 illustrates a conceptual diagram of example components of an electronic device that may be utilized in association with improved packet resiliency associated with a wireless data protocol. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 1104 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 11 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 1118, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1120 for conveying data among components of the respective device. Each component within a device 102 may also be directly connected to other components in addition to, or instead of, being connected to other components across the bus 1120.

The device 102 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 1101, ASR component 1152, etc.) may be configured to generate audio data corresponding to captured audio. The device 102 (using input/output device interfaces 112, antenna 1104, etc.) may also be configured to transmit the audio data to the remote system 106 for further processing or to process the data using internal components such as a wakeword detection component 1101.

Via the antenna(s) 1104, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 106 may include an ASR component 1152. The ASR component 1152 of device 102 may be of limited or extended capabilities. The ASR component 1152 may include language models stored in ASR model storage component, and an ASR component 1152 that performs automatic speech recognition. If limited speech recognition is included, the ASR component 1152 may be configured to identify a limited number of words, such as keywords detected by the device, whereas extended speech recognition may be configured to recognize a much larger range of words.

The device 102 and/or the remote system 106 may include a limited or extended NLU component 1154. The NLU component 1154 of device 102 may be of limited or extended capabilities. The NLU component 1154 may comprise a name entity recognition module, an intent classification module and/or other components. The NLU component 1154 may also include a stored knowledge base and/or entity library, or those storages may be separately located.

In examples, AED 1102 may also be performed by the device 102. In these examples, the operations may include causing the AED component 1102 to be enabled or otherwise turned on, or the operations may include causing the AED component 1102 to transition from a first mode to a second mode representing a higher sensitivity to audio data generated by the microphone 116. The AED component 1102 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 1102 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 1102 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include speechlet 1150 that is configured to execute commands/functions associated with a spoken command as described herein. The device 102 may include a wake word engine, which may be a separate component or may be included in an ASR component 1152. The wakeword detection component 1101 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

Figure 12:
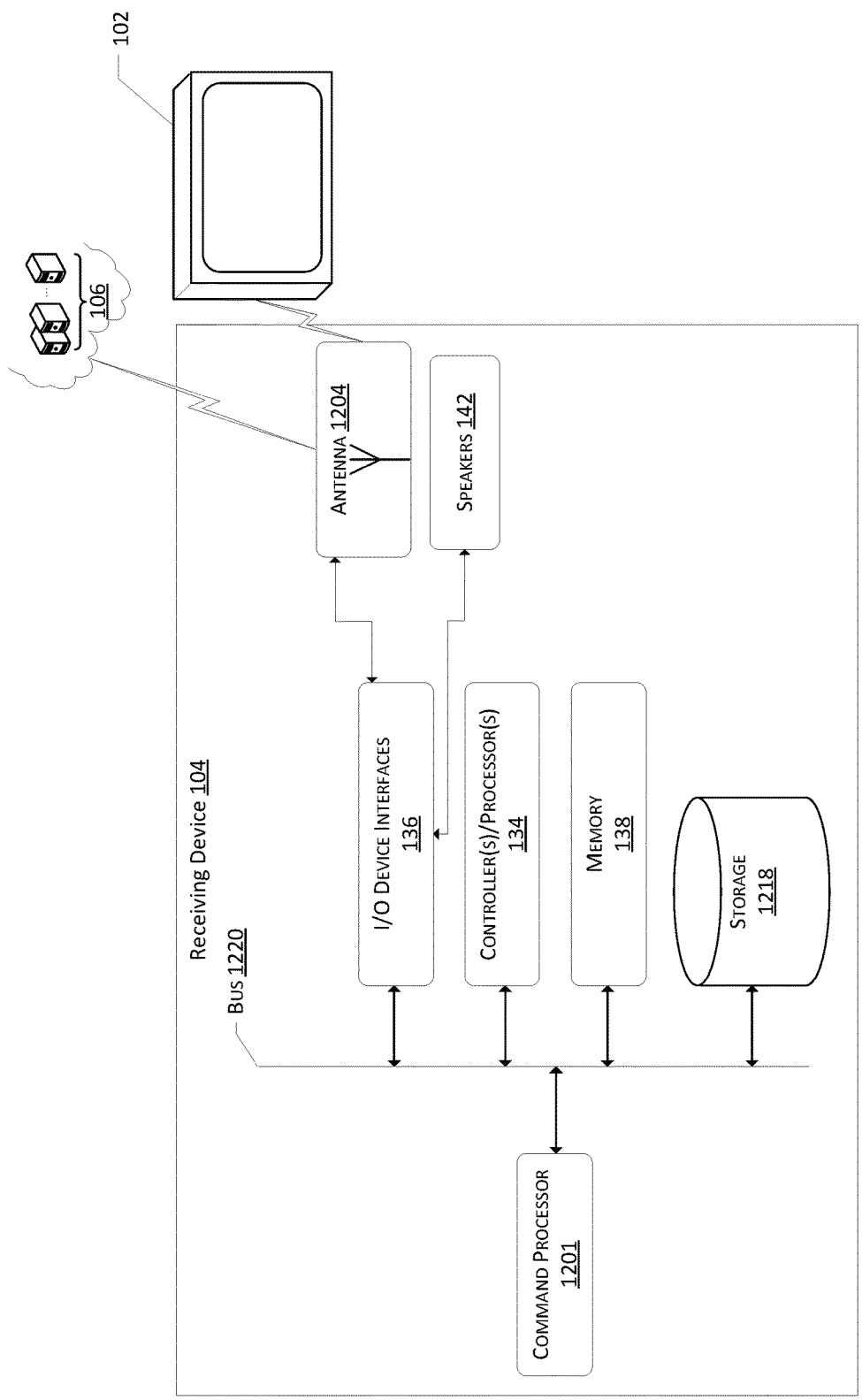
FIG. 12 illustrates a conceptual diagram of example components of a receiving device that may be utilized in association with improved packet resiliency associated with a wireless data protocol.

FIG. 12 illustrates a conceptual diagram of example components of receiving device 104 that may be utilized in association with improved packet resiliency associated with a wireless data protocol. For example, the device 104 may include a device that includes output means to output content, such as audio and/or images. The device 104 may be implemented as a standalone device that is relatively simple in terms of functional capabilities with limited input/output components, memory, and processing capabilities. For instance, the device 104 may not have a keyboard, keypad, touchscreen, or other form of mechanical input. In some instances, the device 104 may include a microphone, a power source, and functionality for sending generated audio data via one or more antennas 1204 to another device and/or system.

The device 104 of FIG. 12 may include one or more controllers/processors 134, that may include a central processing unit (CPU) for processing data and computer-readable instructions, and memory 138 for storing data and instructions of the device 104. In examples, the skills and/or applications described herein may be stored in association with the memory 138, which may be queried for content and/or responses as described herein. The device 104 may also be connected to removable or external non-volatile memory and/or storage, such as a removable memory card, memory key drive, networked storage, etc., through input/output device interfaces 136.

Computer instructions for operating the device 104 and its various components may be executed by the device's controller(s)/processor(s) 134, using the memory 138 as "working" storage at runtime. A device's computer instructions may be stored in a non-transitory manner in non-volatile memory 138, storage 1218, or an external device(s). Alternatively, some or all of the executable instructions may be embedded in hardware or firmware on the device 104 in addition to or instead of software.

The device 104 may include input/output device interfaces 136. A variety of components may be connected through the input/output device interfaces 136. Additionally, the device 104 may include an address/data bus 1220 for conveying data among components of the respective device. Each component within a device 104 may also be directly connected to other components in addition to, or instead of, being connected to other components across the bus 1220.

The processor(s) 134 may comprise graphics processors for driving animation and video output on the associated lights and/or displays. As a way of indicating to a user that a connection between another device has been opened, the device 104 may be configured with one or more visual indicators, such as light(s), which may be in the form of LED(s) or similar components (not illustrated), that may change color, flash, or otherwise provide visible light output, such as for a notification indicator on the device 104. The device 104 may also include an audio capture component. The audio capture component may be, for example, a microphone or array of microphones, a wired headset or a wireless headset, etc. The microphone may be configured to capture audio. If an array of microphones is included, approximate distance to a sound's point of origin may be determined using acoustic localization based on time and amplitude differences between sounds captured by different microphones of the array. The device 104 (using input/output device interfaces 136, antenna 1204, etc.) may also be configured to transmit audio data to the remote system 106 for processing.

Via the antenna(s) 1204, the input/output device interface 136 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc.

The device 104 and/or the remote system 106 may also include a command processor 1201 that is configured to execute commands / functions as described herein. For example, one or more commands may be received by the device 104 from the remote system 106 and/or from another device such as a user device and/or the audio-input device. The command processor 1201 may receive the commands and utilize the components of the device 104 to process those commands. Such commands may cause the device 106 to output sound, such as via speakers.

Figure 13:
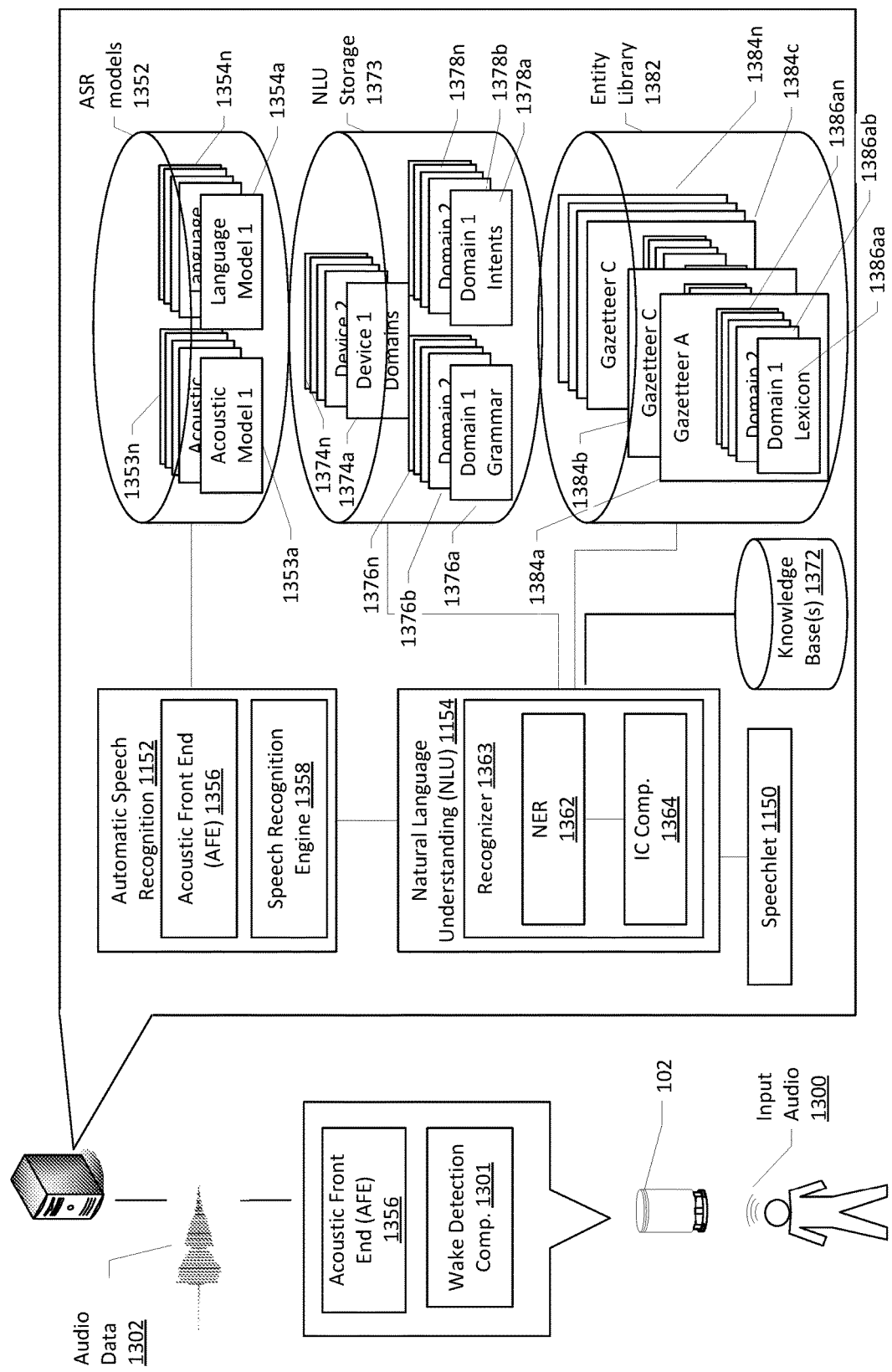
FIG. 13 illustrates a conceptual diagram of components of a speech-processing system for processing audio data provided by one or more devices.

FIG. 13 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 13 may occur directly or across a network 108. An audio capture component, such as a microphone 116 of the device 102, or another device, captures audio 1300 corresponding to a spoken utterance. The device 102, using a wake word engine 1301, then processes audio data corresponding to the audio 1300 to determine if a keyword (such as a wakeword) is detected in the audio data. Following detection of a wakeword, the device 102 sends audio data 1302 corresponding to the utterance to the remote system 104 that includes an ASR component 1152. The audio data 1302 may be output from an optional acoustic front end (AFE) 1356 located on the device prior to transmission. In other instances, the audio data 1302 may be in a different form for processing by a remote AFE 1356, such as the AFE 1356 located with the ASR component 1152 of the remote system 106.

The wake word engine 1301 works in conjunction with other components of the user device, for example a microphone to detect keywords in audio 1300. For example, the device may convert audio 1300 into audio data, and process the audio data with the wake word engine 1301 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1301 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1301 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1302 corresponding to input audio 1300 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 1302 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 1152 may convert the audio data 1302 into text. The ASR transcribes audio data into text data representing the words of the speech contained in the audio data 1302. The text data may then be used by other components for various purposes, such as executing system commands, inputting data, etc. A spoken utterance in the audio data is input to a processor configured to perform ASR which then interprets the utterance based on the similarity between the utterance and pre-established language models 1354 stored in an ASR model knowledge base (ASR Models Storage 1352). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1353 stored in an ASR Models Storage 1352), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1152 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1356 and a speech recognition engine 1358. The acoustic front end (AFE) 1356 transforms the audio data from the microphone into data for processing by the speech recognition engine 1358. The speech recognition engine 1358 compares the speech recognition data with acoustic models 1353, language models 1354, and other data models and information for recognizing the speech conveyed in the audio data. The AFE 1356 may reduce noise in the audio data and divide the digitized audio data into frames representing time intervals for which the AFE 1356 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1358 may process the output from the AFE 1356 with reference to information stored in speech/model storage (1352). Alternatively, post front-end processed data (such as feature vectors) may be received by the device executing ASR processing from another source besides the internal AFE. For example, the user device may process audio data into feature vectors (for example using an on-device AFE 1356) and transmit that information to a server across a network for ASR processing. Feature vectors may arrive at the remote system 106 encoded, in which case they may be decoded prior to processing by the processor executing the speech recognition engine 1358.

The speech recognition engine 1358 attempts to match received feature vectors to language phonemes and words as known in the stored acoustic models 1353 and language models 1354. The speech recognition engine 1358 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Video A?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 1358 may identify, determine, and/or generate text data corresponding to the user utterance, here "play Video A."

The speech recognition engine 1358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1358 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 1154 (e.g., server 106) may include various components, including potentially dedicated processor(s), memory, storage, etc. As shown in FIG. 13, an NLU component 1154 may include a recognizer 1363 that includes a named entity recognition (NER) component 1362 which is used to identify portions of query text that correspond to a named entity that may be recognizable by the system. A downstream process called named entity resolution links a text portion to a specific entity known to the system. To perform named entity resolution, the system may utilize gazetteer information (1384*a*-1384*n*) stored in entity library storage 1382. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 1152 based on the utterance input audio 1300) and attempts to make a semantic interpretation of the text. That is, the NLU process determines the meaning behind the text based on the individual words and then implements that meaning. NLU processing 1154 interprets a text string to derive an intent or a desired action from the user as well as the pertinent pieces of information in the text that allow a device (e.g., device 102) to complete that action. For example, if a spoken utterance is processed using ASR 1152 and outputs the text "play Video A" the NLU process may determine that the user intended to have "Video A" output by one or more devices.

The NLU 1154 may process several textual inputs related to the same utterance. For example, if the ASR 1152 outputs N text segments (as part of an N-best list), the NLU may process all N outputs to obtain NLU results.

As will be discussed further below, the NLU process may be configured to parse and tag to annotate text as part of NLU processing. For example, for the text "play Video A," "play" may be tagged as a command (to output images and/or audio) and "Video A" may be tagged as the naming identifier of the content to be output.

To correctly perform NLU processing of speech input, an NLU process 1154 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1362 receives a query in the form of ASR results and attempts to identify relevant grammars and lexical information that may be used to construe meaning. To do so, the NLU component 1154 may begin by identifying potential domains that may relate to the received query. The NLU storage 1373 includes a database of devices (1374*a*-1374*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1363, language model and/or grammar database (1376a-1376n), a particular set of intents/actions (1378a-1378n), and a particular personalized lexicon (1386). Each gazetteer (1384a-1384n) may include domain-indexed lexical information associated with a particular user and/or device. For example, the Gazetteer A (1384a) includes domain-index lexical information 1386aa to 1386an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1364 parses the query to determine an intent or intents for each identified domain, where the intent corresponds to the action to be performed that is responsive to the query. Each domain is associated with a database (1378a-1378n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1364 identifies potential intents for each identified domain by comparing words in the query to the words and phrases in the intents database 1378. In some instances, the determination of an intent by the IC component 1364 is performed using a set of rules or templates that are processed against the incoming text to identify a matching intent.

In order to generate a particular interpreted response, the NER 1362 applies the grammar models and lexical information associated with the respective domain to actually recognize a mention of one or more entities in the text of the query. In this manner, the NER 1362 identifies "slots" or values (i.e., particular words in query text) that may be needed for later command processing. Depending on the complexity of the NER 1362, it may also label each slot with a type of varying levels of specificity (such as noun, place, device name, device location, city, artist name, song name, amount of time, timer number, or the like). Each grammar model 1376 includes the names of entities (i.e., nouns) commonly found in speech about the particular domain (i.e., generic terms), whereas the lexical information 1386 from the gazetteer 1384 is personalized to the user(s) and/or the device. For instance, a grammar model associated with the shopping domain may include a database of words commonly used when people discuss shopping.

The intents identified by the IC component 1364 are linked to domain-specific grammar frameworks (included in 1376) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1376) framework or frameworks may correspond to sentence structures such as "purchase item called 'Item A' from Marketplace A."

For example, the NER component 1362 may parse the query to identify words as subject, object, verb, preposition, etc., based on grammar rules and/or models, prior to recognizing named entities. The identified verb may be used by the IC component 1364 to identify intent, which is then used by the NER component 1362 to identify frameworks. A framework for the intent of "play a song," meanwhile, may specify a list of slots/fields applicable to play the identified "song" and any object modifier (e.g., specifying a music collection from which the song should be accessed) or the like. The NER component 1362 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1362 may search the database of generic words associated with the domain (in the knowledge base 1372). So, for instance, if the query was "identify this song," after failing to determine which song is currently being output, the NER component 1362 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1150. The destination speechlet 1150 may be determined based on the NLU output. For example, if the NLU output includes a command to send a message, the destination speechlet 1150 may be a message sending application, such as one located on the user device or in a message sending appliance, configured to execute a message sending command. If the NLU output includes a search request, the destination application 136 may include a search engine processor, such as one located on a search server, configured to execute a search command. After the appropriate command is generated based on the intent of the user, the speechlet 1150 may provide some or all of this information to a text-to-speech (TTS) engine. The TTS engine may then generate an actual audio file for outputting the audio data determined by the application 136 (e.g., "okay,"

or "Video A playing"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 1352). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1363. Each recognizer may include various NLU components such as an NER component 1362, IC component 1364 and other components such as an entity resolver, or other components.

For example, a messaging domain recognizer 1363-A (Domain A) may have an NER component 1362-A that identifies what slots (i.e., portions of input text) may correspond to particular words relevant to that domain. The words may correspond to entities such as (for the messaging domain) a recipient. An NER component 1362 may use a machine learning model, such as a domain specific conditional random field (CRF) to both identify the portions corresponding to an entity as well as identify what type of entity corresponds to the text portion. The messaging domain recognizer 1363-A may also have its own intent classification (IC) component 1364-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 14:
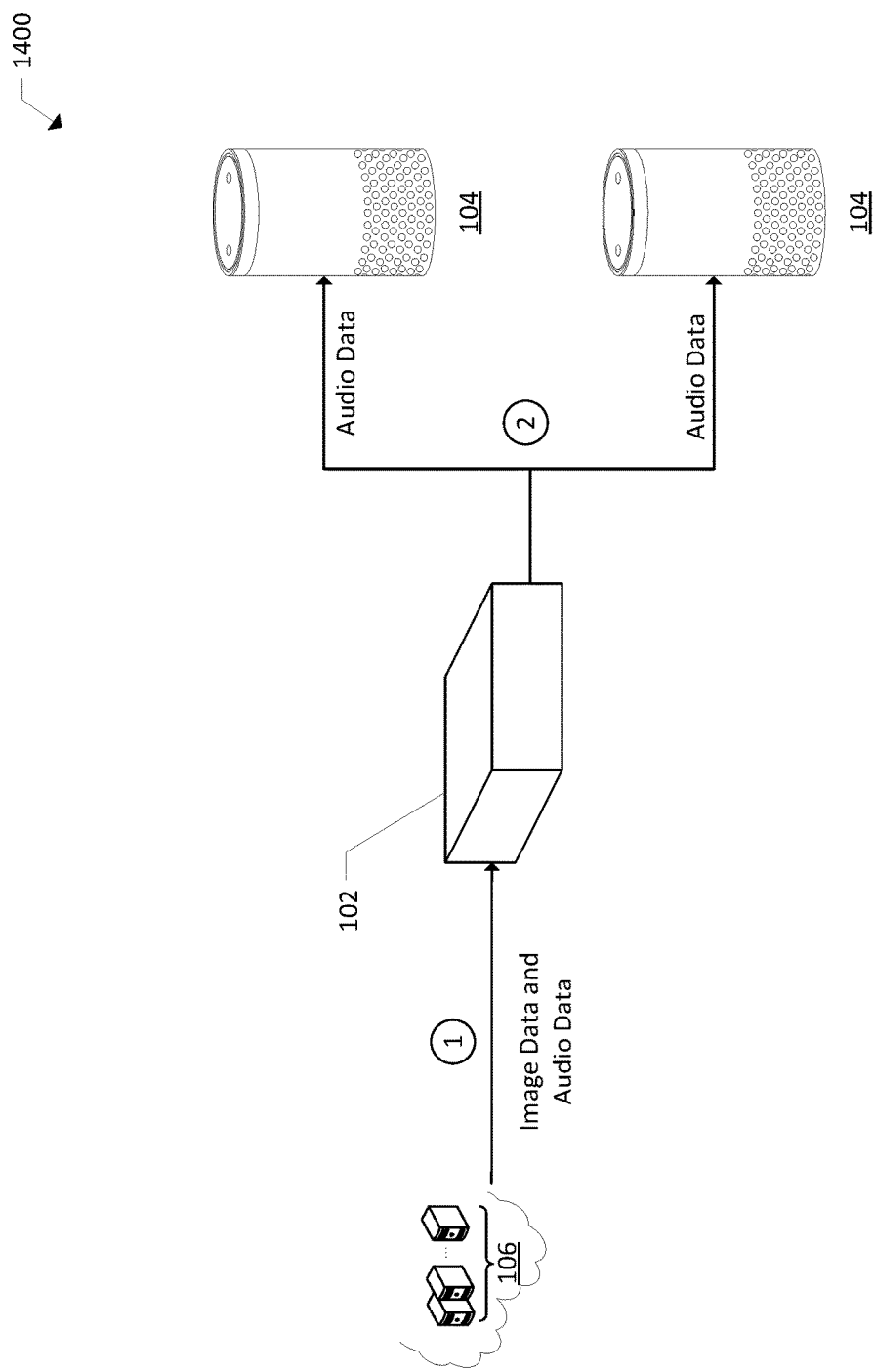
FIG. 14 illustrates a conceptual diagram of example devices utilized for outputting audio in a time-synchronous manner with each other and/or with display of images.

FIG. 14 illustrates a conceptual diagram of example devices utilized for outputting audio in a time-synchronous manner with each other and/or with display of images. The system 1400 may include at least some of the components of the system 100 from FIG. 1. For example, the system 1400 may include an electronic device 102 and/or one or more receiving devices 104 and/or a remote system 106. FIG. 14 depicts the exchange of information and/or the performance of processes via the various components utilizing steps 1 and 2. However, it should be understood that the processes may be performed in any order and need not be performed in sequential order as depicted in FIG. 14.

At step 1, content data, such as image data and audio data, may be sent from the remote system 106 to the electronic device 102. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the remote system 106 configured to retrieve content associated with the request. In examples where the input comprises a user utterance, audio data corresponding to the user utterance may be sent to the remote system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the device 102 for output. A retrieval component may retrieve the requested content and the remote system 106 may send the content to the electronic device 102. The content, in a given example may include image data and audio data. In other examples, the content may include just image data, just audio data, and/or other types of data.

At step 2, the electronic device 102 may send data packets, such as audio-data packets to the receiving devices 104. For example, the electronic device 102 may receive the content data and may send all or a portion of the content data to the receiving devices 104. In these examples, the data may be sent to the receiving devices 104 as data packets utilizing one or more protocols.

The electronic device 102 and/or the receiving devices 104 may utilize associations between time kept by the electronic device 102 and time kept by the receiving devices 104 to determine how and when to send packets to the receiving devices 104 such that the video is output by the electronic device 102 and/or another device having a video interface in a time-synchronous manner with output of the audio on the receiving devices 104.

Figure 15:
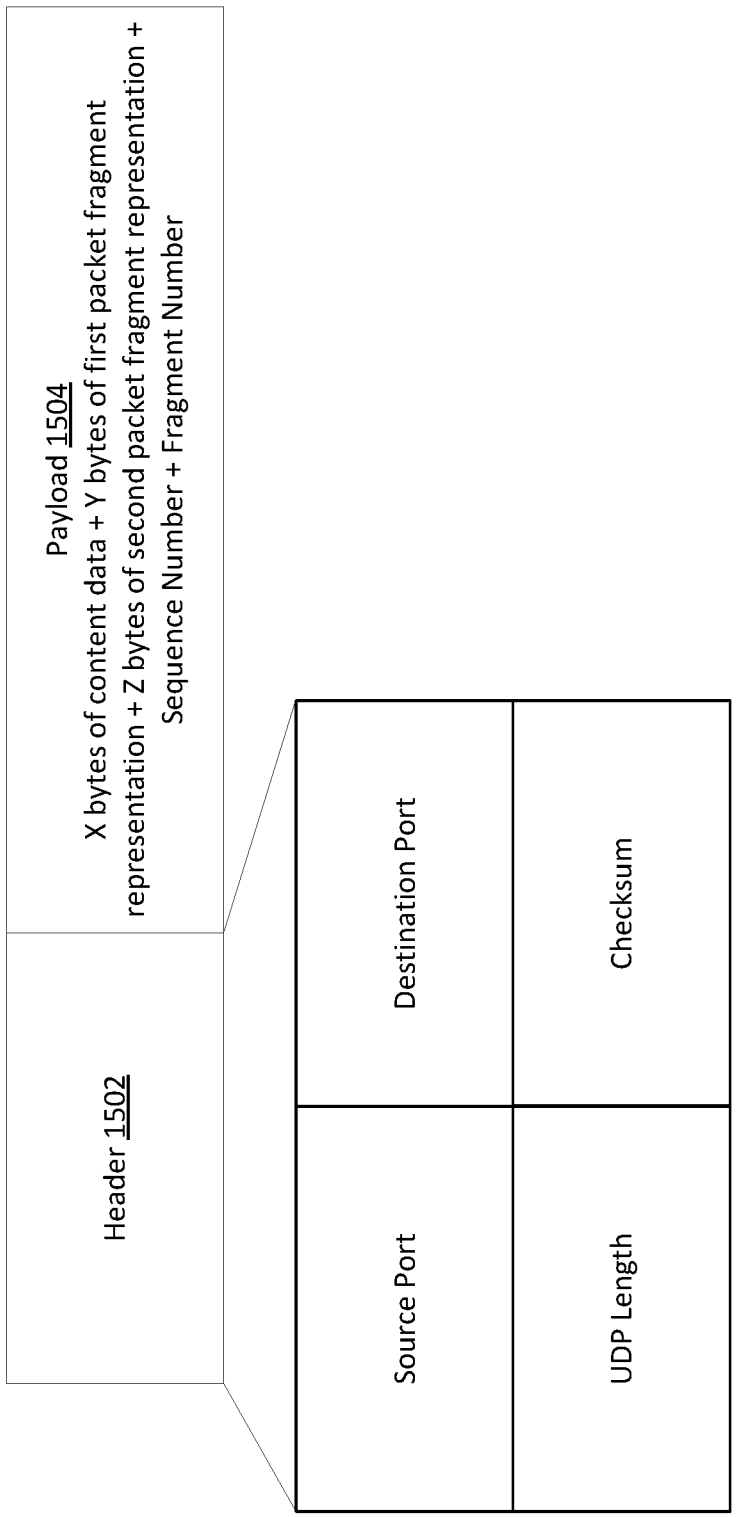
FIG. 15 illustrates a conceptual diagram of an example data packet utilized for a wireless data protocol.

FIG. 15 illustrates a conceptual diagram of an example data packet utilized for a wireless data protocol.

A given data packet may include a header 1502 and a payload 1504. The header 1502 may include control information and the payload 1504 may include the content data to be transmitted between devices as well as packet representations as described more fully herein. The control information of the header 1502 may include information such as source port information, destination port information, UDP length, and a checksum. The payload 1504 may include bytes of the content data to be sent from a sending device to a receiving device. A fragmentation scheme as described herein may be utilized to determine how to split up the content data between packet fragments and how many packets are to be sent. As described herein, the payload 1504 may also include one or more packet representations of two other packets, which may include Xor data generated by a FEC component and appended to the content data. In examples, the Xor data may be the same or a similar length as the content data. In these examples, the size of the payload 1504 of the packet may double in size when only one packet fragment representation is utilized and/or the payload size may remain the same but the amount of content data may be reduced by approximately half When two packet fragment representations are utilized, the size of the payload 1504 may triple in size and/or the payload size may remain the same but the amount of content data may be reduced by approximately one third. The payload 1504 may also include a sequence number for the packet at issue as well as other data such as data indicating a length of the content data, length of packet representations, and/or other data that may assist in sharing the details of the payload. The payload 1504 may also include a fragment number for the packet at issue. The fragment number may indicate which fragment a given packet fragment is, which may be utilized by a receiving device for fragment recovery as described elsewhere herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
   one or more processors; and
   non-transitory computer-readable media storing computer-executable instructions that, when executed by the one or more processors, cause the one or more processors to perform operations comprising:
   receiving audio data including a data packet;
   generating packet fragments from the data packet, the packet fragments including:
      a first packet fragment including a first portion of the audio data;
      a second packet fragment;
      a third packet fragment; and
      a fourth packet fragment;
   generating first data representing the first packet fragment and the second packet fragment;
   generating second data representing the third packet fragment and the fourth packet fragment, wherein:
      the first data and the second data are generated utilizing an Xor operation;
      the first data and the second data are generated utilizing a packet configuration that is based at least in part on third data indicating historical packet loss; and
      the first data and the second data are configured to be utilized by an audio-output device to reconstruct the first packet fragment, the second packet fragment, the third packet fragment, and the fourth packet fragment;
   generating packet data such that the first data and the second data are included with a fifth packet fragment; and
   sending the packet data to the audio-output device.

2. The device of claim 1, the operations further comprising:
   determining, utilizing the third data, that consecutive packet loss occurs more than non-consecutive packet loss at the audio-output device; and
   after determining that consecutive packet loss occurs more than non-consecutive packet loss, determining the packet configuration, the packet configuration indicating that:
      the first packet fragment and the second packet fragment have a first number of packet fragments between the first packet fragment and the fifth packet fragment and between the second packet fragment and the fifth packet fragment; and
      the third packet fragment and the fourth packet fragment are associated with a second number of packet fragments between the third packet fragment and the fifth packet fragment and between the fourth packet fragment and the fifth packet fragment, the second number of packet fragments differing from the first number of packet fragments.

3. The device of claim 1, the operations further comprising:
   determining, utilizing the third data, that consecutive packet loss occurs more than non-consecutive packet loss at the audio-output device; and
   selecting, from determining that consecutive packet loss occurs more than non-consecutive packet loss, the packet configuration, the packet configuration indicating that the data packet is to be fragmented into a larger number of fragments than when non-consecutive packet loss occurs more than consecutive packet loss.

4. The device of claim 1, the operations further comprising:
   determining, utilizing the third data, that non-consecutive packet loss occurs more than consecutive packet loss at the audio-output device; and
   configuring the device to generate the first data instead of the first data and the second data to associate with future data packets when sent to the audio-output device.

5. A method, comprising:
   receiving, at a first device, content data including a data packet;
   generating packet fragments from the data packet, the packet fragments configured to be wirelessly sent to a second device;
   generating first data representing a first packet fragment of the packet fragments and a second packet fragment of the packet fragments;
   generating second data representing a third packet fragment of the packet fragments and a fourth packet fragment of the packet fragments, wherein:
      the first data and the second data are generated utilizing an exclusive disjunction logical operation; and
      the first data and the second data are generated utilizing a packet configuration based at least in part on third data indicating historical packet loss;
   generating packet data with the first data and the second data included with a fifth packet fragment of the packet fragments; and
   sending the packet data to the second device.

6. The method of claim 5, further comprising:
receiving the third data indicating that consecutive packet loss occurs more than non-consecutive packet loss at the second device; and
determining, based at least in part on the third data, that:
the first packet fragment and the second packet fragment are a first number of packet fragments from the fifth packet fragment; and
the third packet fragment and the fourth packet fragment are a second number of packet fragments from the fifth packet fragment, the second number of packet fragments differing from the first number of packet fragments.

7. The method of claim 5, further comprising:
receiving the third data indicating that consecutive packet loss occurs more than non-consecutive packet loss at the second device; and
determining, based at least in part on the third data, that the data packet is to be fragmented into a larger number of fragments than when non-consecutive packet loss occurs more than consecutive packet loss.

8. The method of claim 5, further comprising:
receiving the third data indicating that non-consecutive packet loss occurs more than consecutive packet loss at the second device; and
configuring, based at least in part on the third data, the first device to generate the first data instead of the first data and the second data to associate with data packets when sent to the second device.

9. The method of claim 5, further comprising:
receiving the third data indicating that at least a threshold number of packet fragments of previously-sent data packets are lost at the second device; and
selecting the packet configuration for generating the first data and the second data, the packet configuration indicating that at least the first data and the second data are to be generated for the second packet fragment; and
wherein generating the second data comprises generating the second data based at least in part on the packet configuration.

10. The method of claim 5, wherein the packet fragments include eight packet fragments, and the method further comprises:
determining an association between the first packet fragment and an eighth packet fragment such that the first packet fragment is identified as following the eighth packet fragment; and
selecting at least one of the first packet fragment or the second packet fragment for generating the first data based at least in part on the association.

11. The method of claim 5, wherein:
the first packet fragment and the second packet fragment are a first number of packet fragments away from the fifth packet fragment; and
the third packet fragment and the fourth packet fragment are a second number of packet fragments away from the fifth packet fragment, the second number of packet fragments differing from the first number of packet fragments.

12. The method of claim 5, further comprising:
determining that a third device has been configured to output a first instance of content corresponding to the content data while the second device outputs a second instance of the content; and
sending, to the third device and based at least in part on the third device being configured to output the first instance of the content while the second device outputs the second instance of the content, the packet data including the first data and the second data.

13. A system, comprising:
one or more processors; and
non-transitory computer-readable media storing computer-executable instructions that, when executed by the one or more processors, cause the one or more processors to perform operations comprising:
receiving, at a first device, content data including a data packet;
generating packet fragments from the data packet, the packet fragments configured to be wirelessly sent to second device;
generating first data representing a first packet fragment of the packet fragments and a second packet fragment of the packet fragments;
generating second data representing a third packet fragment of the packet fragments and a fourth packet fragment of the packet fragments, wherein the first data and the second data are generated:
utilizing an exclusive disjunction logical operation; and
utilizing a packet configuration based at least in part on third data indicating historical packet loss;
generating packet data with the first data and the second data included with a fifth packet fragment; and
sending the packet data to the second device.

14. The system of claim 13, the operations further comprising:
receiving the third data indicating that consecutive packet loss occurs more than non-consecutive packet loss at the second device; and
determining, based at least in part on the third data, that:
the first packet fragment and the second packet fragment are a first number of packet fragments from the fifth packet fragment; and
the third packet fragment and the fourth packet fragment are a second number of packet fragments from the fifth packet fragment, the second number of packet fragments differing from the first number of packet fragments.

15. The system of claim 13, the operations further comprising:
receiving the third data indicating that consecutive packet loss occurs more than non-consecutive packet loss at the second device; and
determining, based at least in part on the third data, that the data packet is to be fragmented into a larger number of fragments than when non-consecutive packet loss occurs more than consecutive packet loss.

16. The system of claim 13, the operations further comprising:
receiving the third data indicating that non-consecutive packet loss occurs more than consecutive packet loss at the second device; and
configuring, based at least in part on the third data, the first device to generate the first data instead of the first data and the second data to associate with data packets when sent to the second device.

17. The system of claim 13, the operations further comprising:
- determining that the data packet includes a number of bytes that is greater a default number of bytes associated with a transmission protocol used to communicate between the first device and the second device;
- selecting a configuration for generating the first data and the second data based at least in part on the first number of bytes being greater than the default number of bytes; and
- wherein generating the second data comprises generating the second data based at least in part on the configuration.

18. The system of claim 13, wherein the packet fragments include eight packet fragments, and the operations further comprise:
- determining an association between the first packet fragment an eighth packet fragment such that the first packet fragment is identified as following the eighth packet fragment; and
- selecting at least one of the first packet fragment or the second packet fragment for generating the first data based at least in part on the association.

19. The system of claim 13, wherein:
- the first packet fragment and the second packet fragment are a first number of packet fragments away from the fifth packet fragment; and
- the third packet fragment and the fourth packet fragment are a second number of packet fragments away from the fifth packet fragment, the second number of packet fragments differing from the first number of packet fragments.

20. The system of claim 13, the operations further comprising:
- determining that a third device has been configured to output a first instance of content corresponding to the content data while the second device outputs a second instance of the content; and
- sending, to the third device and based at least in part on the third device being configured to output the first instance of the content, the packet data including the first data and the second data.

* * * * *